United States Patent
Liu et al.

(10) Patent No.: US 12,261,789 B2
(45) Date of Patent: Mar. 25, 2025

(54) COMMUNICATION METHOD AND APPARATUS

(71) Applicant: HUAWEI TECHNOLOGIES CO., LTD., Shenzhen (CN)

(72) Inventors: Zhe Liu, Shanghai (CN); Pengpeng Dong, Shanghai (CN); Jinlin Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 602 days.

(21) Appl. No.: 17/513,065

(22) Filed: Oct. 28, 2021

(65) Prior Publication Data

US 2022/0052812 A1 Feb. 17, 2022

Related U.S. Application Data

(63) Continuation of application No. PCT/CN2020/087915, filed on Apr. 29, 2020.

(30) Foreign Application Priority Data

Apr. 29, 2019 (CN) .......................... 201910356583.4

(51) Int. Cl.
*H04L 5/00* (2006.01)
*H04W 72/044* (2023.01)

(52) U.S. Cl.
CPC .......... *H04L 5/0048* (2013.01); *H04L 5/0094* (2013.01); *H04W 72/044* (2013.01)

(58) Field of Classification Search
CPC ... H04L 5/0026; H04L 5/0048; H04L 5/0051; H04L 5/0057; H04L 5/0094;

(Continued)

(56) References Cited

U.S. PATENT DOCUMENTS

2015/0016291 A1  1/2015  Kim et al.
2015/0124758 A1  5/2015  Kim et al.
(Continued)

FOREIGN PATENT DOCUMENTS

CN  102237951 A  11/2011
CN  108024274 A   5/2018
(Continued)

OTHER PUBLICATIONS

Huang Chenheng: "Review on Physical Layer Key Technology of 3GPP 5G NR", Guangdong Planning and Designing Institute of Telecommunications Co., Ltd.; Oct. 15, 2018, total 8 pages.

(Continued)

*Primary Examiner* — Michael Thier
*Assistant Examiner* — Prince A Mensah
(74) *Attorney, Agent, or Firm* — HAUPTMAN HAM, LLP

(57) ABSTRACT

A method includes sending, by a network device, first configuration information, and sending, by the network device, second configuration information. The first configuration information is useable to map a first reference signal to a first resource element set in a first time element. The first resource element set includes at least a first resource element. The second configuration information is useable to map a second reference signal to a second resource element set in a second time element. The second resource element set includes at least a second resource element. A frequency domain resource occupied by the first resource element overlaps a frequency domain resource occupied by the second resource element in response to the first time element and the second time element overlapping each other in a time domain.

16 Claims, 13 Drawing Sheets

(58) Field of Classification Search
CPC ... H04W 52/325; H04W 72/20; H04W 72/23; H04W 72/044; H04W 72/0446
See application file for complete search history.

(56) References Cited

U.S. PATENT DOCUMENTS

2017/0180095 A1    6/2017    Xue et al.
2018/0367287 A1*  12/2018    Chen .................. H04L 25/0224

FOREIGN PATENT DOCUMENTS

| | | |
|---|---|---|
| CN | 108282309 A | 7/2018 |
| EP | 3285415 A1 | 2/2018 |
| WO | 2018083375 A1 | 5/2018 |

OTHER PUBLICATIONS

Sharp, "3GPP TSG RAN WG1 Meeting #96 R1-1902647", Discussion on rate-matching for LTE CRS, Mar. 1, 2019, total 2 pages.
3GPP TS 38.211 V15.5.0 (Mar. 2019), 3rd Generation Partnership Project; Technical Specification Group Radio Access Network; NR; Physical channels and modulation(Release 15), 96 pages.
3GPP TSF-RAN WG1Meeting #95 Tdoc, R1-1813266, Ericsson Rel-16 Type B PDSCH extensions for LTE-NR coexistence, Nov. 16, 2018, total 6 pages.
3GPP TS 38.214 V15.5.0 (Mar. 2019), 3rd Generation Partnership Project; Technical Specification Group Radio Access Network; NR; Physical layer procedures for data(Release 15), 103 pages.
3GPP TSG RAN WG1 Meeting #94bis,R1-1811997,Summary of DMRS Issues,Qualcomm,Chengdu, China, Oct. 8-12, 2018, total 6 pages.
3GPP TSG RAN WG1 Meeting #95 R1-1812861,ATandT Remaining issues with Rel.15 NR UE features, Nov. 16, 2018, total 10 pages.
Chinese Notice of Allowance issued in corresponding Chinese Application No. 201910356583.4, dated Jul. 26, 2021, pp. 1-4.
Chinese Office Action issued in corresponding Chinese Application No. 201910356583.4, dated Mar. 19, 2021, pp. 1-10.
LG Electronics: "Consideration on DL DMRS for sTTI", 3GPP Draft;R1-1717257,Oct. 8, 2017, XP051340448, total 7 pages.
Samsung: "Feature lead summary for agenda item 7.2.4.1 Physical layer structure for sidelink", 3GPP Draft; R1-1905665,; Apr. 9, 2019, pp. 1-21, XP051707724.
OPPO: "Subcarrier spacing design for data and reference signal", 3GPP Draft; R1-1608900,Oct. 9, 2016, XP051148954, total 7 pages.
Partial Supplementary European Search Report issued in corresponding European Application No. 20798183.8, dated Jun. 7, 2022, pp. 1-21.

* cited by examiner (a) Shift value is 0

(b) Shift value is 1

(c) Shift value is 2

COMMUNICATION METHOD AND APPARATUS

CROSS-REFERENCE TO RELATED APPLICATIONS

This application is a continuation of International Application No. PCT/CN2020/087915, filed on Apr. 29, 2020, which claims priority to Chinese Patent Application No. 201910356583.4, filed on Apr. 29, 2019, the disclosures of the aforementioned applications are hereby incorporated by reference in their entireties.

TECHNICAL FIELD

This application relates to the field of communication technologies, and in particular, to a communication method and apparatus.

BACKGROUND

Currently, there are a plurality of types of reference signals, for example, a cell-specific reference signal (CRS), a demodulation reference signal (DMRS), and the like in a communication system. For a reference signal, a configuration manner of a network device may be: The network device sends configuration information, where the configuration information is used to configure the reference signal on a time-frequency resource. A terminal device receives the configuration information, and determines the time-frequency resource of the reference signal based on the configuration information. The terminal device receives the corresponding reference signal based on the determined time-frequency resource. For the plurality of types of the reference signals, how the network device performs configuration is a current research hotspot.

SUMMARY

At least one embodiment of this application provides a communication method and apparatus, to enable a network device to configure different reference signals for a terminal device.

According to a first aspect, a communication method is provided, including: A network device sends first configuration information, where the first configuration information is used to map a first reference signal to a first resource element set in a first time element, and the first resource element set includes at least a first resource element. The network device sends second configuration information, where the second configuration information is used to map a second reference signal to a second resource element set in a second time element, and the second resource element set includes at least a second resource element. When the first time element and the second time element overlap in time domain, a frequency domain resource occupied by the first resource element overlaps a frequency domain resource occupied by the second resource element.

It can be learned from the foregoing that, in the method of this application, when a first symbol and a second symbol overlap in time domain, frequency domain resources corresponding to the first resource element and the second resource element may overlap. Compared with a solution in which when the first symbol and the second symbol overlap in time domain, the frequency domain resources corresponding to the first resource element and the second resource element cannot overlap, this method can improve frequency domain resource utilization.

In some embodiments, a subcarrier spacing of the first reference signal is a first subcarrier spacing, and in the first subcarrier spacing, a subcarrier index of the first resource element is a first value. When a value of the first value is an integer multiple of $2^n$, the second resource element is not used to transmit the second reference signal. Alternatively, when a value of the first value is not an integer multiple of $2^n$, the second resource element is used to transmit the second reference signal, and n is a positive integer greater than or equal to 1.

In some embodiments, a first subcarrier spike is aligned with a second subcarrier spike. The first subcarrier spike is a subcarrier spike corresponding to a resource element whose subcarrier index is an integer multiple of $2^n$ in the first subcarrier spacing. The second subcarrier spike is a subcarrier spike corresponding to one resource element in a second subcarrier spacing. The first subcarrier spacing is the subcarrier spacing of the first reference signal, and the second subcarrier spacing is a subcarrier spacing of the second reference signal. The second subcarrier spacing is $2^n$ times the first subcarrier spacing.

In some embodiments, the subcarrier spacing of the first reference signal is the first subcarrier spacing, and the subcarrier spacing of the second reference signal is the second subcarrier spacing. The second subcarrier spacing is $2^n$ times the first subcarrier spacing, and n is a positive integer greater than or equal to 1. The first time element in the first subcarrier spacing corresponds to $2^n$ second time elements in the second subcarrier spacing. The method further includes: The network device repeatedly sends the second reference signal in the $2^n$ second time elements corresponding to the first time element.

It can be learned from the foregoing that, in the solution of this application, time domain repetition is equivalent to frequency domain zero padding. According to the solution of this application, the second reference signal is repeatedly sent. In this way, on a premise that time-frequency domain resources of the first reference signal and the second reference signal overlap, interference between the first reference signal and the second reference signal is reduced, a signal-to-interference ratio is improved, and transmission quality of the first reference signal and the second reference signal is ensured.

In some embodiments, the $2^n$ second time elements include at least a third time element and a fourth time element, and the fourth time element uses a cyclic suffix, or a frequency domain signal of the third time element is multiplied by a phase rotation factor, or a frequency domain signal of the fourth time element is multiplied by a phase rotation factor.

In some embodiments, the second configuration information is further used to configure a transmission type of the second reference signal, and the transmission type of the second reference signal is not a first type, or the transmission type of the second reference signal is a second type. In the first type, one resource element in every two resource elements is used to transmit the second reference signal, and in the second type, two resource elements in every six resource elements are used to transmit the second reference signal.

In some embodiments, the method further includes: The network device sends downlink control information, where the downlink control information is used to indicate an index of a code division multiplexing group, and the index of the code division multiplexing group is related to a shift value of the first reference signal.

In some embodiments, that the index of the code division multiplexing group is related to a shift value of the first reference signal includes: the shift value of the first reference signal is 0 or 3, and the index of the code division multiplexing group is 2; or the shift value of the first reference signal is 1 or 4, and the index of the code division multiplexing group is 0; or the shift value of the first reference signal is 2 or 5, and the index of the code division multiplexing group is 1.

According to a second aspect, a communication method is provided, including: A terminal device receives first configuration information, where the first configuration information is used to map a first reference signal to a first resource element set in a first time element, and the first resource element set includes at least a first resource element. The terminal device receives second configuration information, where the second configuration information is used to map a second reference signal to a second resource element set in a second time element, and the second resource element set includes at least a second resource element. When the first time element and the second time element overlap in time domain, a frequency domain resource occupied by the first resource element overlaps a frequency domain resource occupied by the second resource element.

In some embodiments, a subcarrier spacing of the first reference signal is a first subcarrier spacing, and in the first subcarrier spacing, a subcarrier index of the first resource element is a first value. When a value of the first value is an integer multiple of $2^n$, the second resource element is not used to transmit the second reference signal. Alternatively, when a value of the first value is not an integer multiple of $2^n$, the second resource element is used to transmit the second reference signal, and n is a positive integer greater than or equal to 1.

In some embodiments, a first subcarrier spike is aligned with a second subcarrier spike. The first subcarrier spike is a subcarrier spike corresponding to a resource element whose subcarrier index is an integer multiple of $2^n$ in the first subcarrier spacing. The second subcarrier spike is a subcarrier spike corresponding to one resource element in a second subcarrier spacing.

The first subcarrier spacing is the subcarrier spacing of the first reference signal, and the second subcarrier spacing is a subcarrier spacing of the second reference signal. The second subcarrier spacing is $2^n$ times the first subcarrier spacing.

In some embodiments, the subcarrier spacing of the first reference signal is the first subcarrier spacing, and the subcarrier spacing of the second reference signal is the second subcarrier spacing. The second subcarrier spacing is $2^n$ times the first subcarrier spacing, and n is a positive integer greater than or equal to 1. The first time element in the first subcarrier spacing corresponds to $2^n$ second time elements in the second subcarrier spacing. The method further includes: The terminal device repeatedly receives the second reference signal in the $2^n$ second time elements corresponding to the first time element.

In some embodiments, the $2^n$ second time elements include at least a third time element and a fourth time element, and the fourth time element uses a cyclic suffix, or a frequency domain signal of the third time element is multiplied by a phase rotation factor, or a frequency domain signal of the fourth time element is multiplied by a phase rotation factor.

In some embodiments, the second configuration information is further used to configure a transmission type of the second reference signal, and the transmission type of the second reference signal is not a first type, or the transmission type of the second reference signal is a second type. In the first type, one resource element in every two resource elements is used to transmit the second reference signal, and in the second type, two resource elements in every six resource elements are used to transmit the second reference signal.

In some embodiments, the method further includes: The terminal device receives downlink control information, where the downlink control information is used to indicate an index of a code division multiplexing group, and the index of the code division multiplexing group is related to a shift value of the first reference signal. The terminal device determines the second resource element set based on the index of the code division multiplexing group and the shift value of the first reference signal.

In some embodiments, that the index of the code division multiplexing group is related to a shift value of the first reference signal includes: the shift value of the first reference signal is 0 or 3, and the index of the code division multiplexing group is 2; or the shift value of the first reference signal is 1 or 4, and the index of the code division multiplexing group is 0; or the shift value of the first reference signal is 2 or 5, and the index of the code division multiplexing group is 1.

According to a third aspect, a communication apparatus is provided. The apparatus may be a network device, or may be an apparatus in the network device, or an apparatus that can be used in coordination with the network device, and the apparatus may include a transceiver module. In addition, the transceiver module may perform a corresponding function in any possible design example of the first aspect. Details are as follows:

The transceiver module is configured to send first configuration information, where the first configuration information is used to map a first reference signal to a first resource element set in a first time element, and the first resource element set includes at least a first resource element.

The transceiver module is further configured to send second configuration information, where the second configuration information is used to map a second reference signal to a second resource element set in a second time element, and the second resource element set includes at least a second resource element. When the first time element and the second time element overlap in time domain, a frequency domain resource occupied by the first resource element overlaps a frequency domain resource occupied by the second resource element.

In some embodiments, the communication apparatus may further include a processing module, configured to determine the first configuration information, the second configuration information, and the like.

In some embodiments, a subcarrier spacing of the first reference signal is a first subcarrier spacing, and in the first subcarrier spacing, a subcarrier index of the first resource element is a first value. When a value of the first value is an integer multiple of $2^n$, the second resource element is not used to transmit the second reference signal. Alternatively, when a value of the first value is not an integer multiple of $2^n$, the second resource element is used to transmit the second reference signal, and n is a positive integer greater than or equal to 1.

In some embodiments, a first subcarrier spike is aligned with a second subcarrier spike. The first subcarrier spike is a subcarrier spike corresponding to a resource element whose subcarrier index is an integer multiple of $2^n$ in the first subcarrier spacing. The second subcarrier spike is a subcarrier spike corresponding to one resource element in a second subcarrier spacing. The first subcarrier spacing is the subcarrier spacing of the first reference signal, and the second subcarrier spacing is a subcarrier spacing of the second reference signal. The second subcarrier spacing is $2^n$ times the first subcarrier spacing.

In some embodiments, the subcarrier spacing of the first reference signal is the first subcarrier spacing, and the subcarrier spacing of the second reference signal is the second subcarrier spacing. The second subcarrier spacing is $2^n$ times the first subcarrier spacing, and n is a positive integer greater than or equal to 1. The first time element in the first subcarrier spacing corresponds to $2^n$ second time elements in the second subcarrier spacing. The transceiver module is further configured to repeatedly send the second reference signal in the $2^n$ second time elements corresponding to the first time element.

In some embodiments, the $2^n$ second time elements include at least a third time element and a fourth time element, and the fourth time element uses a cyclic suffix, or a frequency domain signal of the third time element is multiplied by a phase rotation factor, or a frequency domain signal of the fourth time element is multiplied by a phase rotation factor.

In some embodiments, the second configuration information is further used to configure a transmission type of the second reference signal, and the transmission type of the second reference signal is not a first type, or the transmission type of the second reference signal is a second type. In the first type, one resource element in every two resource elements is used to transmit the second reference signal, and in the second type, two resource elements in every six resource elements are used to transmit the second reference signal.

In some embodiments, the transceiver module is further configured to send downlink control information, where the downlink control information is used to indicate an index of a code division multiplexing group, and the index of the code division multiplexing group is related to a shift value of the first reference signal.

In some embodiments, that the index of the code division multiplexing group is related to a shift value of the first reference signal includes: the shift value of the first reference signal is 0 or 3, and the index of the code division multiplexing group is 2; or the shift value of the first reference signal is 1 or 4, and the index of the code division multiplexing group is 0; or the shift value of the first reference signal is 2 or 5, and the index of the code division multiplexing group is 1.

According to a fourth aspect, a communication apparatus is provided. The apparatus includes a communication interface, configured to implement the method described in the first aspect. The communication interface is used by the apparatus to communicate with another device. For example, the communication interface may be a transceiver, a circuit, a bus, a module, or another type of communication interface, and the another device may be a terminal device, or the like. The apparatus further includes a processor. When executing program instructions stored in a memory, the processor is configured to control the communication interface to implement the method described in the first aspect. The apparatus may further include the memory. The memory is configured to store instructions and data. In some embodiments, the apparatus includes:

the memory, configured to store program instructions;

the communication interface, configured to send first configuration information, where the first configuration information is used to map a first reference signal to a first resource element set in a first time element, and the first resource element set includes at least a first resource element; and the communication interface is further configured to send second configuration information, where the second configuration information is used to map a second reference signal to a second resource element set in a second time element, and the second resource element set includes at least a second resource element. When the first time element and the second time element overlap in time domain, a frequency domain resource occupied by the first resource element overlaps a frequency domain resource occupied by the second resource element.

In some embodiments, a subcarrier spacing of the first reference signal is a first subcarrier spacing, and in the first subcarrier spacing, a subcarrier index of the first resource element is a first value. When a value of the first value is an integer multiple of $2^n$, the second resource element is not used to transmit the second reference signal. Alternatively, when a value of the first value is not an integer multiple of $2^n$, the second resource element is used to transmit the second reference signal, and n is a positive integer greater than or equal to 1.

In some embodiments, a first subcarrier spike is aligned with a second subcarrier spike. The first subcarrier spike is a subcarrier spike corresponding to a resource element whose subcarrier index is an integer multiple of $2^n$ in the first subcarrier spacing. The second subcarrier spike is a subcarrier spike corresponding to one resource element in a second subcarrier spacing. The first subcarrier spacing is the subcarrier spacing of the first reference signal, and the second subcarrier spacing is a subcarrier spacing of the second reference signal. The second subcarrier spacing is $2^n$ times the first subcarrier spacing.

In some embodiments, the subcarrier spacing of the first reference signal is the first subcarrier spacing, and the subcarrier spacing of the second reference signal is the second subcarrier spacing. The second subcarrier spacing is $2^n$ times the first subcarrier spacing, and n is a positive integer greater than or equal to 1. The first time element in the first subcarrier spacing corresponds to $2^n$ second time elements in the second subcarrier spacing. The communication interface is further configured to repeatedly send the second reference signal in the $2^n$ second time elements corresponding to the first time element.

In some embodiments, the $2^n$ second time elements include at least a third time element and a fourth time element, and the fourth time element uses a cyclic suffix, or a frequency domain signal of the third time element is multiplied by a phase rotation factor, or a frequency domain signal of the fourth time element is multiplied by a phase rotation factor.

In some embodiments, the second configuration information is further used to configure a transmission type of the second reference signal, and the transmission type of the second reference signal is not a first type, or the transmission type of the second reference signal is a second type. In the first type, one resource element in every two resource elements is used to transmit the second reference signal, and in the second type, two resource elements in every six resource elements are used to transmit the second reference signal.

In some embodiments, the communication interface is further configured to send downlink control information, where the downlink control information is used to indicate an index of a code division multiplexing group, and the index of the code division multiplexing group is related to a shift value of the first reference signal.

In some embodiments, that the index of the code division multiplexing group is related to a shift value of the first reference signal includes: the shift value of the first reference signal is 0 or 3, and the index of the code division multiplexing group is 2; or the shift value of the first reference signal is 1 or 4, and the index of the code division multiplexing group is 0; or the shift value of the first reference signal is 2 or 5, and the index of the code division multiplexing group is 1.

According to a fifth aspect, a communication apparatus is provided. The apparatus may be a terminal device, or may be an apparatus in the terminal device, or an apparatus that can be used in coordination with the terminal device. The apparatus may include a transceiver module. In addition, the transceiver module may perform a corresponding function in any possible design example of the second aspect. Details are as follows:

The transceiver module is configured to receive first configuration information, where the first configuration information is used to map a first reference signal to a first resource element set in a first time element, and the first resource element set includes at least a first resource element.

The transceiver module is further configured to receive second configuration information, where the second configuration information is used to map a second reference signal to a second resource element set in a second time element, and the second resource element set includes at least a second resource element. When the first time element and the second time element overlap in time domain, a frequency domain resource occupied by the first resource element overlaps a frequency domain resource occupied by the second resource element.

In some embodiments, a subcarrier spacing of the first reference signal is a first subcarrier spacing, and in the first subcarrier spacing, a subcarrier index of the first resource element is a first value. When a value of the first value is an integer multiple of $2^n$, the second resource element is not used to transmit the second reference signal. Alternatively, when a value of the first value is not an integer multiple of $2^n$, the second resource element is used to transmit the second reference signal, and n is a positive integer greater than or equal to 1.

In some embodiments, a first subcarrier spike is aligned with a second subcarrier spike. The first subcarrier spike is a subcarrier spike corresponding to a resource element whose subcarrier index is an integer multiple of $2^n$ in the first subcarrier spacing. The second subcarrier spike is a subcarrier spike corresponding to one resource element in a second subcarrier spacing. The first subcarrier spacing is the subcarrier spacing of the first reference signal, and the second subcarrier spacing is a subcarrier spacing of the second reference signal. The second subcarrier spacing is $2^n$ times the first subcarrier spacing.

In some embodiments, the subcarrier spacing of the first reference signal is the first subcarrier spacing, and the subcarrier spacing of the second reference signal is the second subcarrier spacing. The second subcarrier spacing is $2^n$ times the first subcarrier spacing, and n is a positive integer greater than or equal to 1. The first time element in the first subcarrier spacing corresponds to $2^n$ second time elements in the second subcarrier spacing. The transceiver module is further configured to repeatedly receive the second reference signal in the $2^n$ second time elements corresponding to the first time element.

In some embodiments, the $2^n$ second time elements include at least a third time element and a fourth time element, and the fourth time element uses a cyclic suffix, or a frequency domain signal of the third time element is multiplied by a phase rotation factor, or a frequency domain signal of the fourth time element is multiplied by a phase rotation factor.

In some embodiments, the second configuration information is further used to configure a transmission type of the second reference signal, and the transmission type of the second reference signal is not a first type, or the transmission type of the second reference signal is a second type. In the first type, one resource element in every two resource elements is used to transmit the second reference signal, and in the second type, two resource elements in every six resource elements are used to transmit the second reference signal.

In some embodiments, the apparatus further includes a processing module. The transceiver module is further configured to receive downlink control information. The downlink control information is used to indicate an index of a code division multiplexing group, and the index of the code division multiplexing group is related to a shift value of the first reference signal. The processing module is further configured to determine the second resource element set based on the index of the code division multiplexing group and the shift value of the first reference signal.

In some embodiments, that the index of the code division multiplexing group is related to a shift value of the first reference signal includes: the shift value of the first reference signal is 0 or 3, and the index of the code division multiplexing group is 2; or the shift value of the first reference signal is 1 or 4, and the index of the code division multiplexing group is 0; or the shift value of the first reference signal is 2 or 5, and the index of the code division multiplexing group is 1.

According to a sixth aspect, a communication apparatus is provided. The apparatus includes a processor, configured to implement the method described in the second aspect. The apparatus may further include a memory, configured to store instructions and data. The memory is coupled to the processor. When executing the program instructions stored in the memory, the processor can implement the method described in the second aspect. The apparatus may further include a communication interface. The communication interface is used by the apparatus to communicate with another device. For example, the communication interface may be a transceiver, a circuit, a bus, a module, or another type of communication interface, and the another device may be a first terminal device or the like. In some embodiments, the apparatus includes:

a memory, configured to store program instructions;

a communication interface, configured to receive first configuration information, where the first configuration information is used to map a first reference signal to a first resource element set in a first time element, and the first resource element set includes at least a first resource element; and the communication interface is further configured to receive second configuration information, where the second configuration information is used to map a second reference signal to a second resource element set in a second time element, and the second resource element set includes at least a second resource element. When the first time element and the second time element overlap in time domain, a frequency domain resource occupied by the first resource element overlaps a frequency domain resource occupied by the second resource element.

In some embodiments, a subcarrier spacing of the first reference signal is a first subcarrier spacing, and in the first subcarrier spacing, a subcarrier index of the first resource element is a first value. When a value of the first value is an integer multiple of $2^n$, the second resource element is not used to transmit the second reference signal. Alternatively, when a value of the first value is not an integer multiple of $2^n$, the second resource element is used to transmit the second reference signal, and n is a positive integer greater than or equal to 1.

In some embodiments, a first subcarrier spike is aligned with a second subcarrier spike. The first subcarrier spike is a subcarrier spike corresponding to a resource element whose subcarrier index is an integer multiple of $2^n$ in the first subcarrier spacing. The second subcarrier spike is a subcarrier spike corresponding to one resource element in a second subcarrier spacing. The first subcarrier spacing is the subcarrier spacing of the first reference signal, and the second subcarrier spacing is a subcarrier spacing of the second reference signal. The second subcarrier spacing is $2^n$ times the first subcarrier spacing.

In some embodiments, the subcarrier spacing of the first reference signal is the first subcarrier spacing, and the subcarrier spacing of the second reference signal is the second subcarrier spacing. The second subcarrier spacing is $2^n$ times the first subcarrier spacing, and n is a positive integer greater than or equal to 1. The first time element in the first subcarrier spacing corresponds to $2^n$ second time elements in the second subcarrier spacing. The communication interface is further configured to repeatedly receive the second reference signal in the $2^n$ second time elements corresponding to the first time element.

In some embodiments, the $2^n$ second time elements include at least a third time element and a fourth time element, and the fourth time element uses a cyclic suffix, or a frequency domain signal of the third time element is multiplied by a phase rotation factor, or a frequency domain signal of the fourth time element is multiplied by a phase rotation factor.

In some embodiments, the second configuration information is further used to configure a transmission type of the second reference signal, and the transmission type of the second reference signal is not a first type, or the transmission type of the second reference signal is a second type. In the first type, one resource element in every two resource elements is used to transmit the second reference signal, and in the second type, two resource elements in every six resource elements are used to transmit the second reference signal.

In some embodiments, the apparatus further includes a processor. The communication interface is further configured to receive downlink control information. The downlink control information is used to indicate an index of a code division multiplexing group, and the index of the code division multiplexing group is related to a shift value of the first reference signal. The processor is further configured to determine the second resource element set based on the index of the code division multiplexing group and the shift value of the first reference signal.

In some embodiments, that the index of the code division multiplexing group is related to a shift value of the first reference signal includes: the shift value of the first reference signal is 0 or 3, and the index of the code division multiplexing group is 2; or the shift value of the first reference signal is 1 or 4, and the index of the code division multiplexing group is 0; or the shift value of the first reference signal is 2 or 5, and the index of the code division multiplexing group is 1.

According to a seventh aspect, an embodiment of this application further provides a computer-readable storage medium, including instructions. When the instructions are run on a computer, the computer is enabled to perform the method according to any possible design in the first aspect or the second aspect.

According to an eighth aspect, an embodiment of this application further provides a chip system. The chip system includes a processor, may further include a memory, and is configured to implement the method in the first aspect or the second aspect. The chip system may include a chip, or may include a chip and another discrete component.

According to a ninth aspect, an embodiment of this application further provides a computer program product, including instructions. When the instructions are run on a computer, the computer is enabled to perform the method in the first aspect or the second aspect.

According to a tenth aspect, an embodiment of this application provides a system, where the system includes the apparatus according to the third aspect and the apparatus according to the fifth aspect, or the system includes the apparatus according to the fourth aspect and the apparatus according to the sixth aspect.

DESCRIPTION OF EMBODIMENTS

The following describes the technical solutions in the embodiments of this application with reference to the accompanying drawings in the embodiments of this application.

Figure 1:
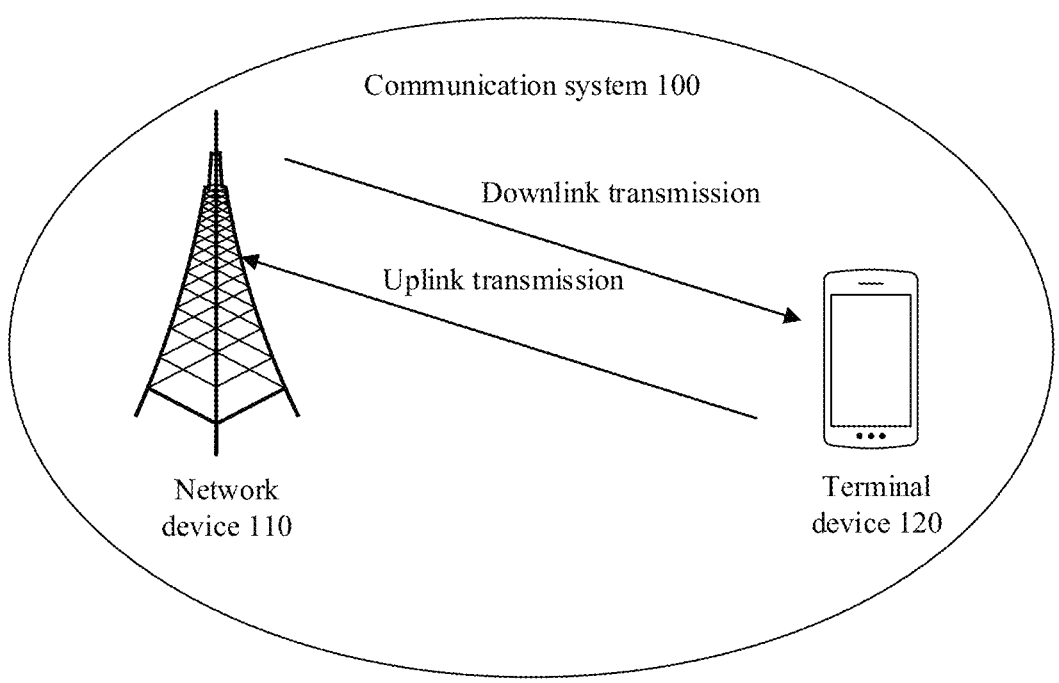
FIG. 1 is a schematic diagram of a communication system according to an embodiment of this application.

FIG. 1 shows a communication system 100 to which an embodiment of this application is applied. The communication system 100 may include at least one network device 110. The network device 110 may be a device, for example, a base station or a base station controller, that communicates with a terminal device. Each network device 110 may provide communication coverage for a specific geographical area, and may communicate with a terminal device located in the coverage area (a cell). The network device 110 may be a base transceiver station (BTS) in a global system for mobile communications (GSM) system or code division multiple access (CDMA), may be a NodeB (NB) in a wideband code division multiple access (WCDMA) system, may be an evolved NodeB (eNodeB) in an LTE system, or may be a wireless controller in a cloud radio access network (CRAN) scenario. Alternatively, the network device may be a relay station, an access point, a vehicle-mounted device, a wearable device, or a network device in a future 5G network, for example, a gNodeB (gNB) or a transmission receiving point (TRP) in new radio (NR). Alternatively, the network device 110 may be a network device in a future evolved public land mobile network (PLMN) or the like. This is not limited in this embodiment of this application.

The communication system 100 further includes one or more terminal devices 120 within coverage of the network device 110. The terminal device 120 may be mobile or fixed. The terminal device 120 may refer to an access terminal, user equipment (UE), a subscriber unit, a subscriber station, a mobile station, a mobile console, a remote station, a remote terminal, a mobile device, a user terminal, a terminal, a wireless communication device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in this embodiment of this application.

Data transmission may be performed between the network device 110 and the terminal device 120 by using an air interface resource. The air interface resource may include at least one of a time domain resource, a frequency domain resource, or a code domain resource. Specifically, when the network device 110 and the terminal device 120 perform data transmission, the network device 110 may send control information to the terminal device 120 through a control channel, for example, a physical downlink control channel (PDCCH), to allocate a data channel to the terminal device 120, for example, a resource of a physical downlink shared channel (PDSCH) or a physical uplink shared channel (PUSCH). For example, the control information may indicate a time element and/or a resource block (RB) to which the data channel is mapped. The network device 110 and the terminal device 120 perform data transmission on the allocated time-frequency resource through the data channel. The data transmission may include downlink data transmission and/or uplink data transmission, and the downlink data (for example, data carried in a PDSCH) transmission may be that the network device 110 sends data to the terminal device 120. The uplink data (for example, data carried on a PUSCH) transmission may be that the terminal device 120 sends data to the network device 110. The data may be data in a broad sense, for example, may be user data, or may be system information, broadcast information, or other information.

FIG. 1 shows an example of a network device and a terminal device. In some embodiments, the communication system 100 may include a plurality of network devices, and coverage of one network device may include another quantity of terminal devices. This is not limited in this embodiment of this application.

The following explains and describes some communication nouns or terms used in this application. The communication nouns or the terms are also used as a part of the content of the present application.

☐. Time Element

A time element may refer to a period of time in time domain, and a unit of the time element may be a unit, for example, a radio frame (radio frame), a subframe (subframe), a slot (slot), a mini-slot (mini-slot), or a symbol (symbol). For example, in a specific implementation, one time element may include one or more slots. For another example, one radio frame may include one or more subframes, and one subframe may include one or more slots. There may be different slot lengths for different subcarrier spacings. For example, one slot may be 1 millisecond (ms) when a subcarrier spacing is 15 kHz; or one slot may be 0.5 ms when a subcarrier spacing is 30 kHz. One slot may include one or more symbols. For example, a slot with a normal cyclic prefix (cyclic prefix, CP) may include 14 time domain symbols, and a slot with an extended CP may include 12 time domain symbols. The time domain symbol may be referred to as a symbol for short. The time domain symbol may be an orthogonal frequency division multiplexing (OFDM) symbol, or may be a discrete Fourier transform spread orthogonal frequency division multiplexing (DFT-s-OFDM) symbol. A mini-slot, also referred to as a mini-slot, may be a smaller unit than a slot, and one mini-slot may include one or more symbols. For example, one mini-slot may include two symbols, four symbols, seven symbols, or the like. One slot may include one or more mini-slots.

☐. Cyclic Prefix (CP)

One slot in NR includes 14 OFDM symbols, and one OFDM symbol includes a cyclic prefix and a useful information part. The cyclic prefix is a part in a last specific length of the OFDM symbol, and an OFDM symbol that is lengthened after the cyclic prefix is added is used as a new OFDM symbol. In this way, inter-symbol interference caused by multipath can be eliminated.

Figure 2:
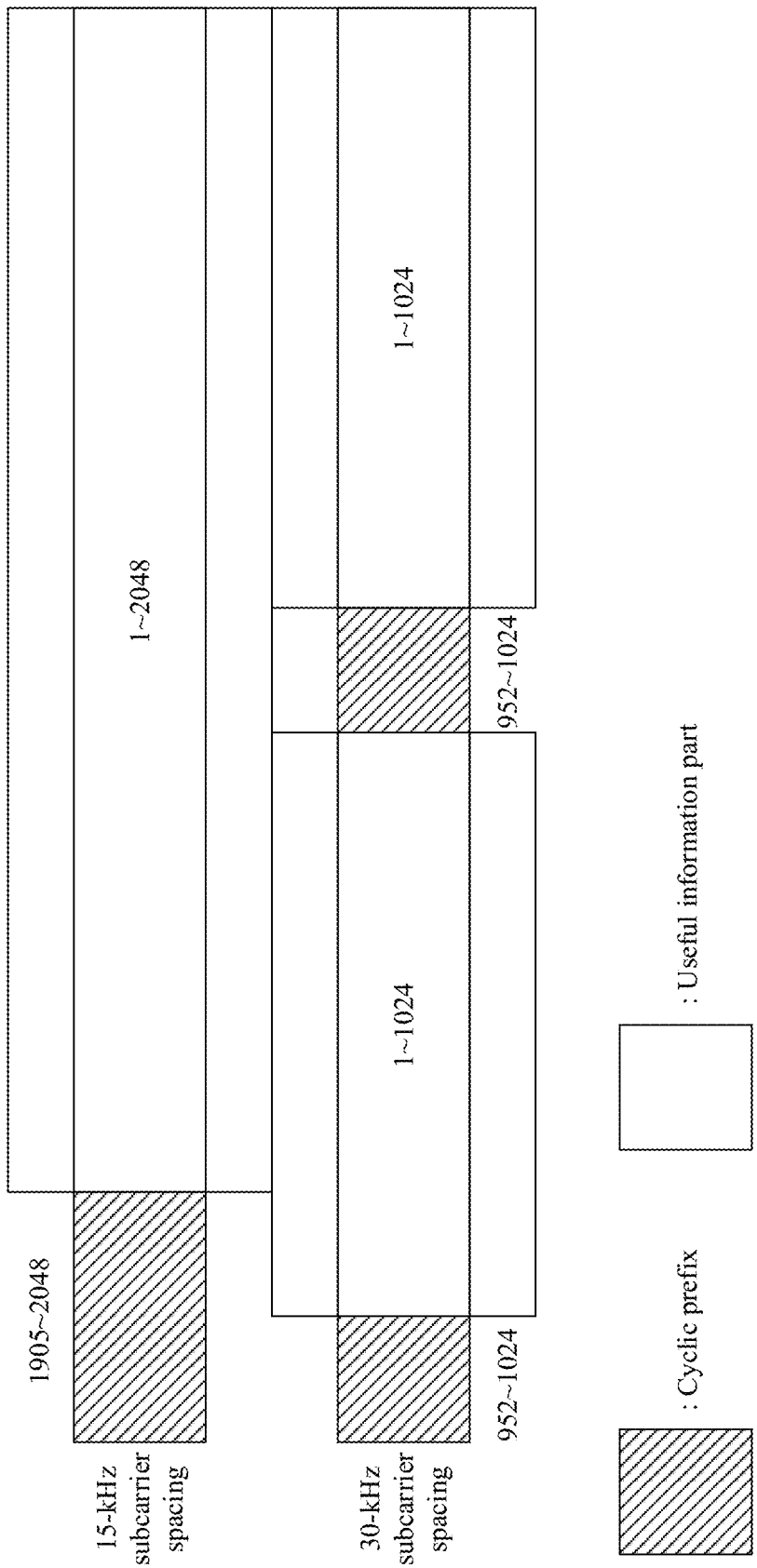
FIG. 2 is a schematic diagram of a CP according to an embodiment of this application.

As shown in FIG. 2, an OFDM symbol of a 15-kHz subcarrier spacing (SCS) includes a cyclic prefix part and a useful information part. The useful information part includes 2048 sampling points (sampling points numbered from 1 to 2048).

The cyclic prefix part includes 144 sampling points (sampling points numbered from 1905 to 2048). Specifically, the cyclic prefix means that the last 144 sampling points (sampling points numbered from 1905 to 2048) of the useful information part are extracted and placed in the header of the OFDM symbol. In addition, in the 15-kHz SCS, seven OFDM symbols are included every 0.5 ms. The detailed analysis is as follows:

In the seven OFDM symbols, a useful information part of each symbol includes 2048 sampling points. In the seven OFDM symbols, a CP length of one symbol includes 160 sampling points, and each CP length of the other six symbols includes 144 sampling points. It can be learned that a total quantity of sampling points included in the seven OFDM symbols is (2048*7+160+144*6)=15,360 sampling points. An absolute time length of one sampling point is $1/(2048*15*1000)$s, and the seven OFDM symbols correspond to 0.5 ms. Therefore, an absolute time length of the 14 OFDM symbols included in one slot is 1 ms.

Still refer to FIG. 2. A time domain length of one 15-kHz OFDM symbol is equal to a time domain length of two 30-kHz OFDM symbols. For one OFDM symbol of the 30-kHz SCS, a cyclic prefix part includes sampling points numbered from 952 to 1024, and a useful information part includes sampling points numbered from 1 to 1024. An absolute time length of one sampling point is $1/(2048*15*1000)$s.

□. Cell-Specific Reference Signal (CRS)

In a wireless communication system, a network device may send the CRS to a terminal device. The CRS is used by the terminal device to perform channel estimation. After receiving the CRS, the terminal device may perform the channel estimation based on the CRS, and demodulate a control channel or a data channel based on a channel estimation result. Therefore, the terminal device obtains control information transmitted on the control channel or data information on the data channel.

Figure 3:
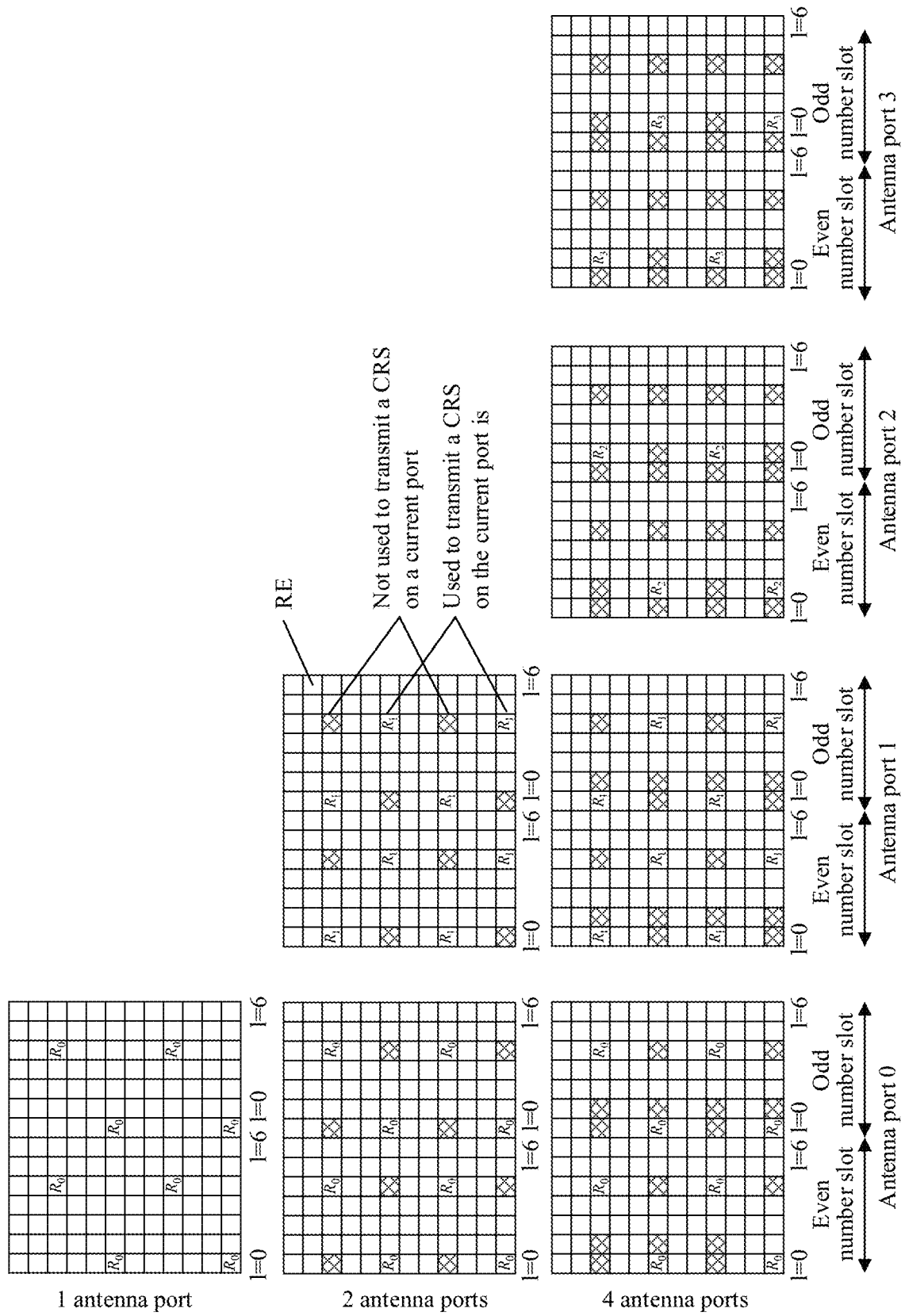
FIG. 3 is a schematic diagram of a CRS density according to an embodiment of this application.

Currently, the network device may send the CRS to the terminal device by using one or more antenna ports, to improve accuracy of channel estimation performed by a user. Different CRSs with different densities are used for different quantities of CRS antenna ports. As shown in FIG. 3, when the CRS has 1/2/4 antenna ports, in a physical resource block (PRB), for a resource element (RE) that is in each antenna port and that is used to transmit the CRS, refer to a slash padding part.

In addition, the RE actually occupied by the CRS is related to a shift (shift) value of the CRS. The shift value is equal to a result obtained after a physical cell ID of a carrier mod 6. The shift value of the CRS indicates a cyclic shift of a CRS resource in frequency domain. For example, when the shift value of the CRS is 0, RE resources occupied by the CRS of one antenna port in the first OFDM symbol are the first RE and the seventh RE. When the shift value of the CRS is 1, one subcarrier is cyclically shifted, that is, RE resources occupied by the CRS of one antenna port in the first OFDM symbol are respectively the second RE and the eighth RE. RE resources actually occupied by two antenna ports and four antenna ports may also be obtained based on the pattern and the shift value shown in FIG. 3, and are not described herein again.

□. Demodulation Reference Signal (DMRS)

A resource element occupied by a DMRS on one OFDM symbol is related to factors such as a DMRS type and a code division multiplexing (CDM) group number indicated by DCI. For a physical downlink shared channel (PDSCH) transmitted in a slot (slot), the DMRS may be configured on a symbol 2 or a symbol 3 of a slot. For a PDSCH transmitted in a mini-slot (minislot), DMRS mapping may start from a first OFDM symbol in the mini-slot. In addition, to better demodulate the PDSCH, NR further supports an additional DMRS symbol position. The additional OFDM symbol position is related to a quantity of OFDM symbols occupied in a slot by the PDSCH transmitted in the slot. That is not described herein again.

A configuration type of the DMRS may include a first type and a second type. In the first type, one resource element in every two resource elements is used to transmit the DMRS. In the second type, two resource elements in every six resource elements are used to transmit the DMRS.

Figure 4:
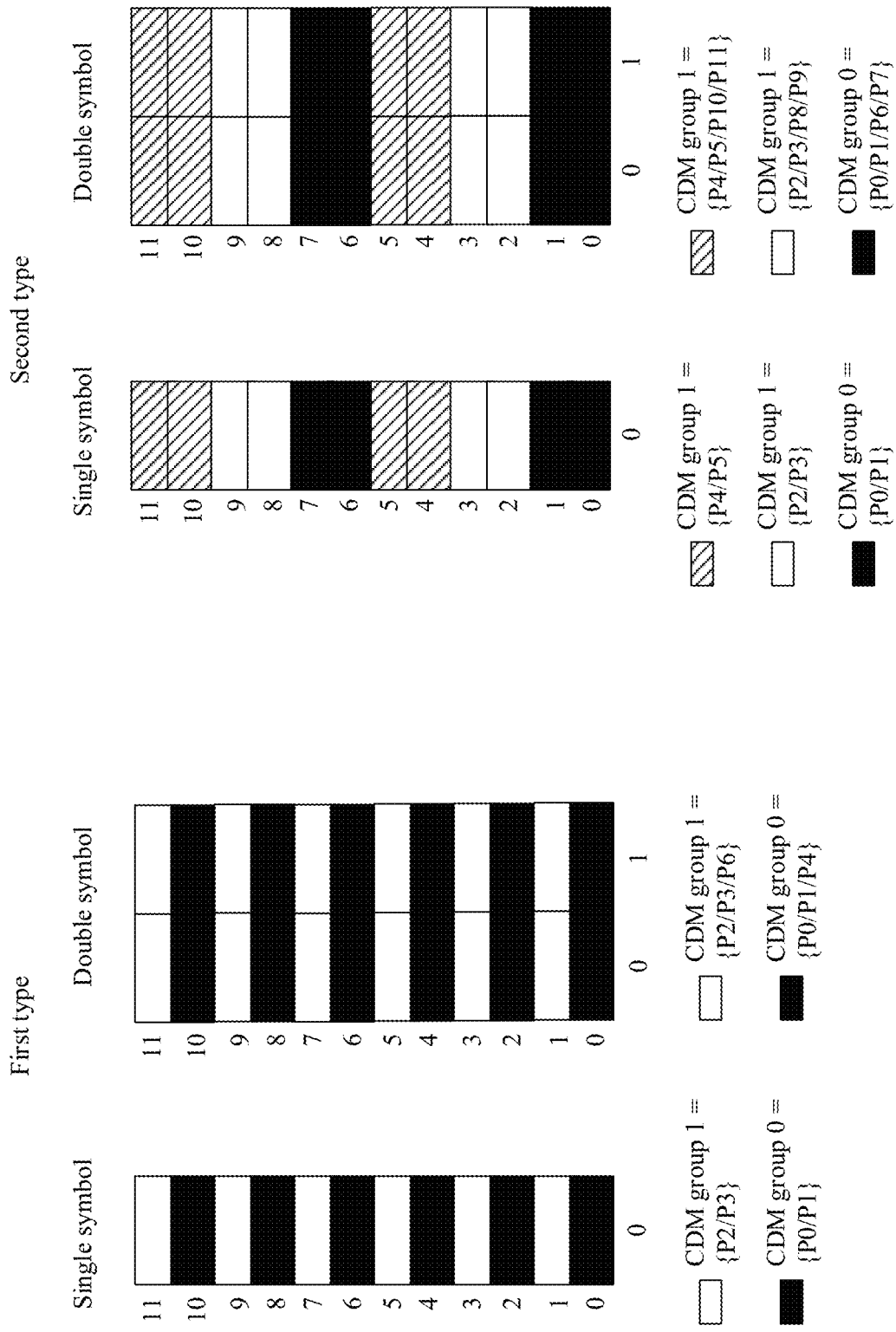
FIG. 4 is a schematic diagram of different types of DMRSs according to an embodiment of this application.

Specifically, as shown in FIG. 4, when scheduling information indicates that the PDSCH mapping type is slot scheduling, the slot scheduling may also be referred to as type-A PDSCH mapping, and the DMRS is mapped to a symbol 2 and a symbol 3 in each slot. In some embodiments, for the additional OFDM symbol position, the DMRS may also be mapped to a symbol 8 and a symbol 9 in each slot. A process of mapping to the symbol 2 and the symbol 3 in each slot is similar to a process of mapping to the symbol 8 and the symbol 9. In the embodiments of this application, mapping to the symbol 2 and the symbol 3 is used as an example for description.

For example, the network device may send DCI to the terminal device, and the DCI may indicate a CDM group index (CDM group). For the first type, if the CDM group index indicated by the DCI is 0, the DMRS is mapped to a black filled resource element of the first type shown in FIG. 4. If the CDM group index indicated by the DCI is 1, the DMRS is mapped to a white filled resource element of the first type shown in FIG. 4. A manner of mapping the second-type DMRS is similar to that of mapping the first-type DMRS. Details are not described herein again.

Further, the first type may include a single symbol (single symbol) and a double symbol (double symbol), and the second type may include a single symbol and a double symbol. For the type-A PDSCH mapping, a single symbol may refer to the symbol 2 or the symbol 3 in each slot. The double symbol may refer to the symbol 2 and the symbol 3 in each slot.

□. Rate Matching

When a frequency domain resource of an NR carrier and a frequency domain resource of an LTE carrier are overlapped, to enable the NR carrier to fully utilize an unused RE resource of the LTE carrier and avoid interference to a CRS signal continuously transmitted on the LTE carrier, it is supported in a current protocol that rate matching is performed, for an NR PDSCH, on an RE resource corresponding to an LTE CRS, that is, information bits of the PDSCH are not mapped to the RE resource corresponding to the CRS. For example, an entire resource grid includes 168 REs, and 16 REs are used to transmit the CRS. The information bits of the PDSCH are set to 100 bits, and a process of the rate matching may be: distributing the 100 bits information on 152 REs (168−16=152 REs).

Figure 5:
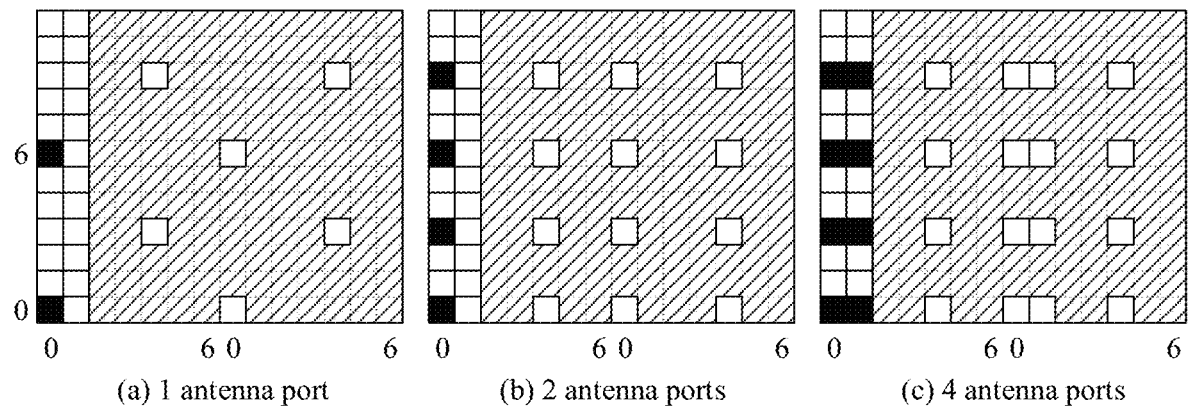
FIG. 5 is a schematic diagram of rate matching according to an embodiment of this application.

For example, when two OFDM symbols are configured for a PDCCH of the LTE carrier to transmit the CRS, to avoid interference to the LTE PDCCH, the NR PDSCH mapping may start from the third OFDM symbol. As shown in FIG. 5, for a case of 1/2/4 antenna ports, a CRS may be mapped to the first two symbols in each slot. In FIG. 5, for REs used to transmit the CRS, refer to a black filled part. To avoid interference to the CRS, in FIG. 5, a DMRS may be transmitted in a slash padding part. For details about a resource block used to transmit the DMRS, refer to a white padding part.

☐. Carrier Bandwidth

Figure 6:
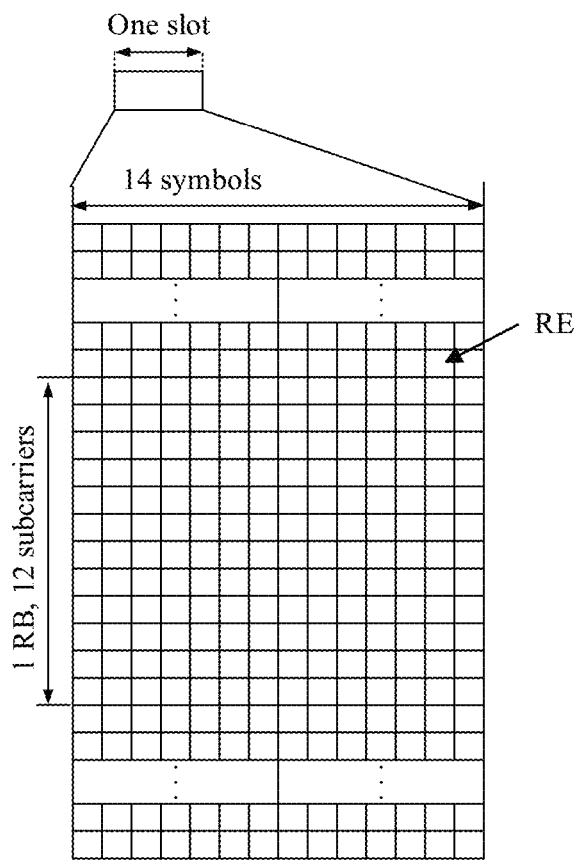
FIG. 6 is a schematic diagram of a resource grid according to an embodiment of this application.

A network device and a terminal device may perform data transmission by using a time-frequency resource, and the time-frequency resource used to perform data transmission may be represented as a resource grid. In the resource grid, a resource element (RE) is a resource element used to perform data transmission, or an RE is a unit used to perform resource mapping on to-be-sent data. As shown in FIG. 6, one RE may be corresponding to one symbol in time domain, for example, an OFDM symbol or a DFT-s-OFDM symbol, and may be corresponding to one subcarrier in frequency domain. Specifically, the RE may be configured to map a complex symbol, for example, a complex symbol obtained through modulation, or a complex symbol obtained through precoding. This is not specifically limited in the embodiments of this application.

Further, a resource block (RB) may be defined in the resource grid. In frequency domain, one RB may include a positive integer quantity of subcarriers, for example, 12 subcarriers. In time domain, one RB may include a positive integer quantity of symbols, for example, seven symbols. For example, as shown in FIG. 6, one RB may be defined as a time-frequency resource block whose frequency domain includes 12 subcarriers, and whose time domain includes 14 symbols.

Further, the resource grid may include one or more RBs. A concept of a slot (slot) may be defined in time domain of the resource grid. One slot may include a positive integer quantity of symbols, for example, 7 symbols, 14 symbols, or 12 symbols. In the example shown in FIG. 6, an example in which one slot includes 14 symbols is used for description.

Further, one subframe may include one or more slots. For example, when a subcarrier spacing is 15 kilohertz (kHz), one subframe includes one slot. When a subcarrier spacing is 30 kHz, one subframe includes two slots. When a subcarrier spacing is 60 kHz, one subframe includes four slots.

VII. Carrier Bandwidth Part (BWP)

The carrier bandwidth part may be referred to as a bandwidth part (bandwidth part, BWP) for short. The BWP may be a group of contiguous frequency domain resources on a carrier. For example, the BWP may be a group of consecutive resource blocks (RB) on the carrier, or the BWP is a group of consecutive subcarriers on the carrier, or the BWP is a group of consecutive resource block groups (RBG) on the carrier. One RBG includes at least one RB, for example, one, two, four, six, or eight RBs, and one RB may include at least one subcarrier, for example, 12 subcarriers. In a possible implementation, for example, in a method shown in NR Release 15 (release 15, Rel-15), in one cell, for a terminal device, a network may configure a maximum of four BWPs for the terminal device. In frequency division duplexing (FDD), four BWPs may be configured on each of an uplink and a downlink. In time division duplexing (TDD), four BWPs may be configured on each of an uplink and a downlink. For example, center frequency bands of BWPs with a same number are aligned. For each BWP, a network device may configure, for the terminal device, a system parameter that includes a subcarrier spacing and/or a CP length. At any moment, in one cell, the terminal device may activate one BWP, and the terminal device and the network device transmit and receive data on the active BWP. An existing BWP is defined on a given carrier, that is, a resource of one BWP is located in one carrier resource. Certainly, another definition of a BWP, another BWP activation solution, or the like is not limited in this application.

In a carrier bandwidth (carrier BW), only one BWP may be configured for one UE. A bandwidth of the BWP may be less than or equal to a UE bandwidth capability, and the UE bandwidth capability may be less than or equal to the carrier bandwidth (carrier BW). In a carrier bandwidth, two BWPs, namely, a BWP 1 and a BWP 2, may be configured for one UE, and a bandwidth of the BWP 1 and a bandwidth of the BWP 2 may overlap. In a carrier bandwidth, two BWPs, namely, a BWP 1 and a BWP 2, may be configured for one UE, and the BWP 1 and the BWP 2 may not overlap. System parameters of the BWP 1 and the BWP 2 may be a same system parameter, or may be different system parameters. In practice, a BWP configuration (for example, a configuration such as a quantity of BWPs, a BWP position, and/or a system parameter of a BWP) may alternatively be another configuration. This is not limited in the embodiments of this application.

It should be noted that, in the embodiments of this application, terms such as "first" and "second" are merely used for the purpose of distinction in description, and cannot be understood as indicating or implying relative importance, or as indicating or implying a sequence.

Figure 7:
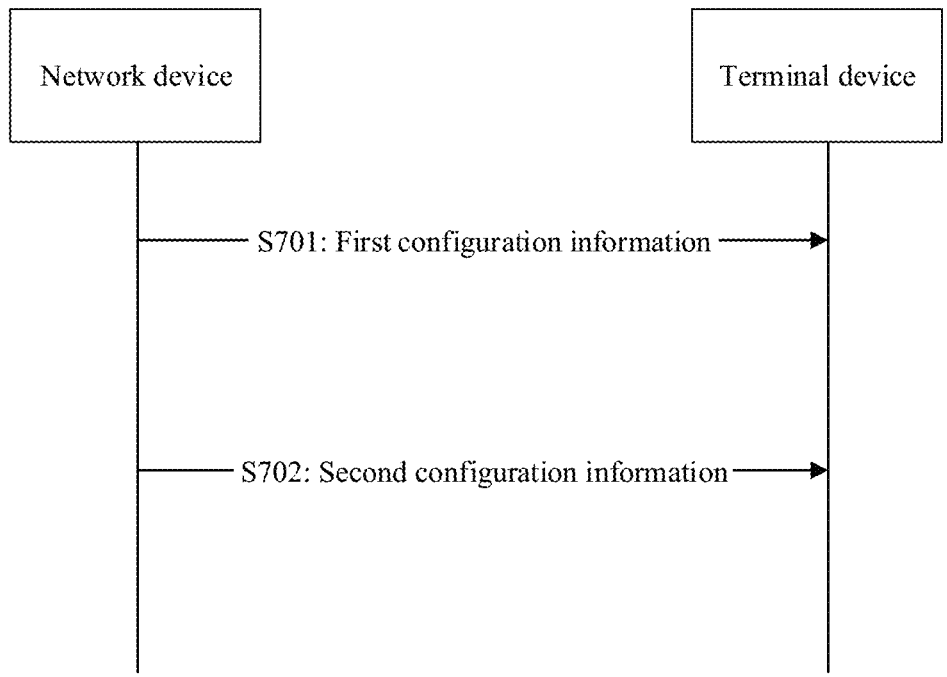
FIG. 7 is a flowchart of a communication method according to an embodiment of this application.

As shown in FIG. 7, a communication method procedure is provided. A network device in the procedure may be the network device 110 in FIG. 1, and a terminal device may be the terminal device 120 in FIG. 1. It may be understood that a function of the network device may also be implemented by using a chip used in the network device, or another apparatus is used to support the network device in implementing the function of the network device. A function of the terminal device may also be implemented by using a chip used in the terminal device, or another apparatus is used to support the terminal device in implementing the function of the terminal device. The procedure includes the following steps.

S701: A network device sends first configuration information to a terminal device. The first configuration information is used to map a first reference signal to a first resource set in a first time element, where the first resource set includes at least a first resource element.

S702: The network device sends second configuration information to the terminal device. The second configuration information is used to map a second reference signal to a second resource set in a second time element, where the second resource set includes at least a second resource element.

When the first time element and the second time element overlap in time domain, a frequency domain resource occupied by the first resource element overlaps a frequency domain resource occupied by the second resource element.

In some embodiments, a manner of sending the first configuration information and the second configuration information is not limited. For example, the first configuration information and the second configuration information may be carried in one message and simultaneously sent. Alternatively, the first configuration information and the second configuration information may be carried in different messages and separately sent. Alternatively, the first configuration information and the second configuration information may not be carried in any message, and are separately sent, or the like.

In some embodiments, the second configuration information is further used to configure a type of the second reference signal, and the type of the second reference signal may be a second type. Alternatively, it may be referred to as that the type of the second reference signal is not a first type. For example, when the second reference signal is a DMRS, for the first type and the second type, refer to the descriptions in FIG. 4.

For example, in the first type, one resource element in every two resource elements is used to transmit the second reference signal. In the second type, two resource elements in every six resource elements are used to transmit the second reference signal.

In some embodiments, the procedure shown in FIG. 7 may further include: The network device sends downlink control information. Correspondingly, the terminal device receives the downlink control information. For example, the downlink control information may be used to indicate an index of a code division multiplexing group, the index of the code division multiplexing group is related to a shift value of the first reference signal, and the index of the code division multiplexing group and the shift value of the first reference signal are used to determine the second resource element set. For example, when the shift value of the first reference signal is 0 or 3, the index of the code division multiplexing group may be 2. When the shift value of the first reference signal is 1 or 4, the index of the code division multiplexing group may be 0. When the shift value of the first reference signal is 2 or 5, the index of the code division multiplexing group may be 1. When the first reference signal is a CRS, and the second reference signal is a DMRS, for different relationships between a shift value and a code division multiplexing group index, refer to the descriptions in FIG. 13. Details are not described herein again.

For example, it is specified that a subcarrier spacing of the first reference signal is a first subcarrier spacing and a subcarrier spacing of the second reference signal is a second subcarrier spacing. The second subcarrier spacing is $2^n$ times the first subcarrier spacing, and n is a positive integer greater than or equal to 1. In time domain, one time element in the first subcarrier spacing is corresponding to $2^n$ time elements in the second subcarrier spacing; in frequency domain, one resource element in the second subcarrier spacing is corresponding to $2^n$ resource elements in the first subcarrier spacing.

The network device determines the first configuration information and the second configuration information. For information about the first configuration information and the second configuration information, refer to the foregoing descriptions. Details are not described herein again. If the first time element and the second time element overlap in time domain, the network device may determine that a frequency domain resource occupied by one or more resource elements in the first resource set overlaps a frequency domain resource occupied by one or more resource elements in the second resource set. In this embodiment of this application, a frequency domain resource occupied by one resource element in the first resource set overlaps a frequency domain resource occupied by one resource element in the second resource set, which is similar to a process in which a frequency domain resource occupied by a plurality of resource elements in the first resource set overlaps a frequency domain resource occupied by a plurality of resource elements in the second resource element set. In this embodiment of this application, an example in which the frequency domain resource occupied by one resource element in the first resource set overlaps the frequency domain resource occupied by one resource element in the second resource set is used for description. For ease of description, in the following embodiments, one resource element in the first resource set is referred to as the first resource element, and one resource element in the second resource set is referred to as the second resource element.

In this embodiment of this application, a specific implementation in which the frequency domain resource occupied by the first resource element overlaps the frequency domain resource occupied by the second resource element may be: setting a subcarrier index of the first resource element to a first value. A value of the first value may only be an odd number, for example, the first value may be 1, 3, 5, or the like. That is, the second resource element may overlap only a frequency domain resource occupied by a first resource element whose subcarrier index is an odd number. The odd number may be further described as follows: A value of the first value is not an integer multiple of $2^n$, or a value of the first value is a non-integer multiple of $2^n$. Alternatively, it may be further described as follows: A value of the first value is not an even number, that is, the second resource element does not overlap a frequency domain resource occupied by a first resource element whose subcarrier index is an even number. The even number may be further described as follows: A value of the first value is an integer multiple of $2^n$.

Figure 8:
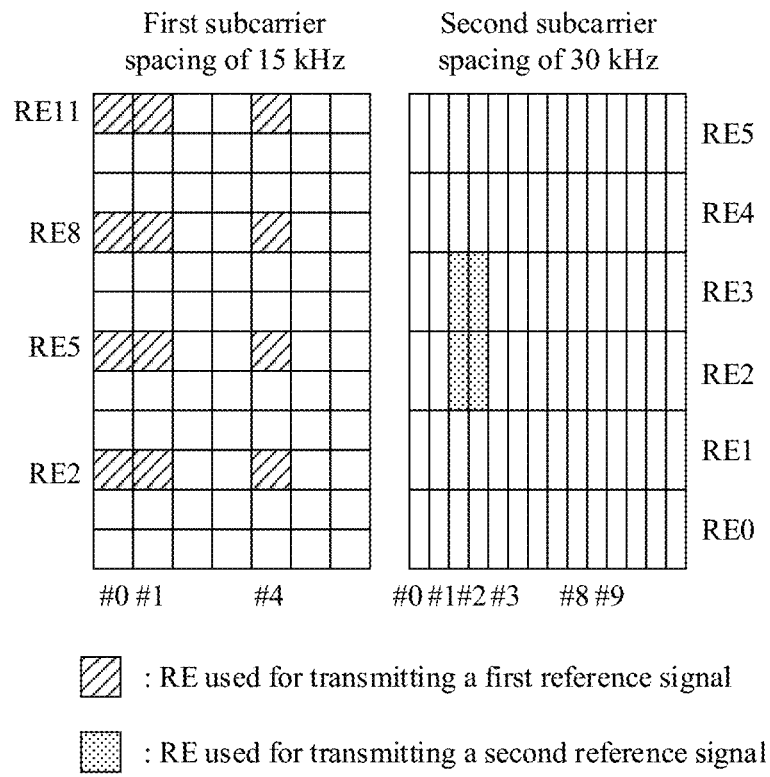
FIG. 8 is a schematic diagram of mapping a first reference signal and a second reference signal according to an embodiment of this application.

For example, as shown in FIG. 8, in the first subcarrier spacing, in time domain, the first configuration information is used to map the first reference signal to time elements {#0, #1, #4}. In frequency domain, the first configuration information is used to map the first reference signal to a first resource element set {RE2, RE5, RE8, RE11}. In the second subcarrier spacing, in time domain, the second configuration information is used to map the second reference signal to time elements {#2, #3}. In frequency domain, the second configuration information is used to map the second reference signal to a second resource element set {RE2, RE3}.

It can be learned from the foregoing description that when a value of the first time element is #1, and values of the second time element are #2 and #3, the first time element and the second time element overlap in time domain, a value of the first resource element is RE5, and a value of the second resource element is RE2. Frequency domain resources occupied by RE5 and RE2 may overlap. A subcarrier index of RE5 is 5, which is an odd number.

Correspondingly, in Embodiment 1, a network device may transmit a first reference signal by using a first resource element included in a first resource element set, and transmit a second signal by using a second resource element included in a second resource element set.

The network device determines first configuration information and second configuration information. For the first configuration information and the second configuration information, refer to the foregoing descriptions. Details are not described herein again. If a first time element and a second time element overlap in time domain, the network device may determine that a frequency domain resource occupied by one or more resource elements in the first resource set overlaps a frequency domain resource occupied by one or more resource elements in the second resource set. For ease of description, in the following embodiments, an example is used for description, where one resource element in the first resource set is referred to as the first resource element, one resource element in the second resource set is referred to as the second resource element, and frequency domain resources occupied by the first resource element and the second resource element overlap.

For example, if a subcarrier index of the first resource element is set to a first value, a value of the first value may be an odd number or an even number. That is, the network device may configure that frequency domain resources occupied by a first resource element with an index of an odd number and the second resource element overlap, or the network device may configure that frequency domain resources occupied by a first resource element with an index of an even number and the second resource element overlap. For definitions of the odd number and the even number, refer to Embodiment 1, and details are not described herein again.

Different from Embodiment 1, if the network device configures that frequency domain resources occupied by a first resource element with an index of an odd number and the second resource element overlap, the second resource element is used to transmit a second reference signal. If the network device configures that frequency domain resources occupied by a first resource element with an index of an even number and the second resource element overlap, the second resource element is not used to transmit the second reference signal.

For example, for Embodiment 1 and Embodiment 2, the subcarrier index of the first resource element may be defined in the following manner: A first subcarrier spike and a second subcarrier spike are aligned. The first subcarrier spike may be a subcarrier spike corresponding to a resource element whose subcarrier index is an integer multiple of $2^n$ in the first subcarrier spacing. The second subcarrier spike may be a subcarrier spike corresponding to any resource element in the second subcarrier spacing. The resource element whose subcarrier index is an integer multiple of $2^n$ may be, for example, a resource element whose subcarrier index is 0, a resource element whose subcarrier index is 2, a resource element whose subcarrier index is 4, or the like.

It may be understood that the subcarrier spike in the embodiments of this application may be understood as a spike of a subcarrier, a subcarrier peak, or the like. The alignment of the first subcarrier spike and the second subcarrier spike may be understood as: A frequency domain position corresponding to a first subcarrier peak overlaps a frequency domain position corresponding to a second subcarrier peak. Alternatively, it may be described as follows: A frequency domain position corresponding to a first subcarrier peak whose subcarrier index is an integer multiple of $2^n$ overlaps a frequency domain position corresponding to any second subcarrier peak.

In some embodiments, the procedure shown in FIG. 7 may further include: The network device repeatedly sends the second reference signal in $2^n$ second time elements corresponding to the first time element. For example, the $2^n$ second time elements are specified to include at least a third time element and a fourth time element. The second reference signal may be repeatedly sent in the $2^n$ second time elements in the following manners:

EXAMPLE 1

The fourth time element uses a cyclic suffix. In some embodiments, the third time element uses a cyclic prefix. An objective is to enable $2^n$ corresponding time elements (that is, the third time element and the fourth time element) to be repeated in time domain after the cyclic prefix is removed from the first time element.

For example, the foregoing time elements are all OFDM symbols. For ease of description, the first time element is referred to as a first OFDM symbol, the third time element is referred to as a third OFDM symbol, and the fourth time element is referred to as a fourth OFDM symbol. An example in which an SCS of the first OFDM symbol is 15 kHz and SCSs of the third OFDM symbol and the fourth OFDM symbol are 30 kHz is used for description.

Figure 9:
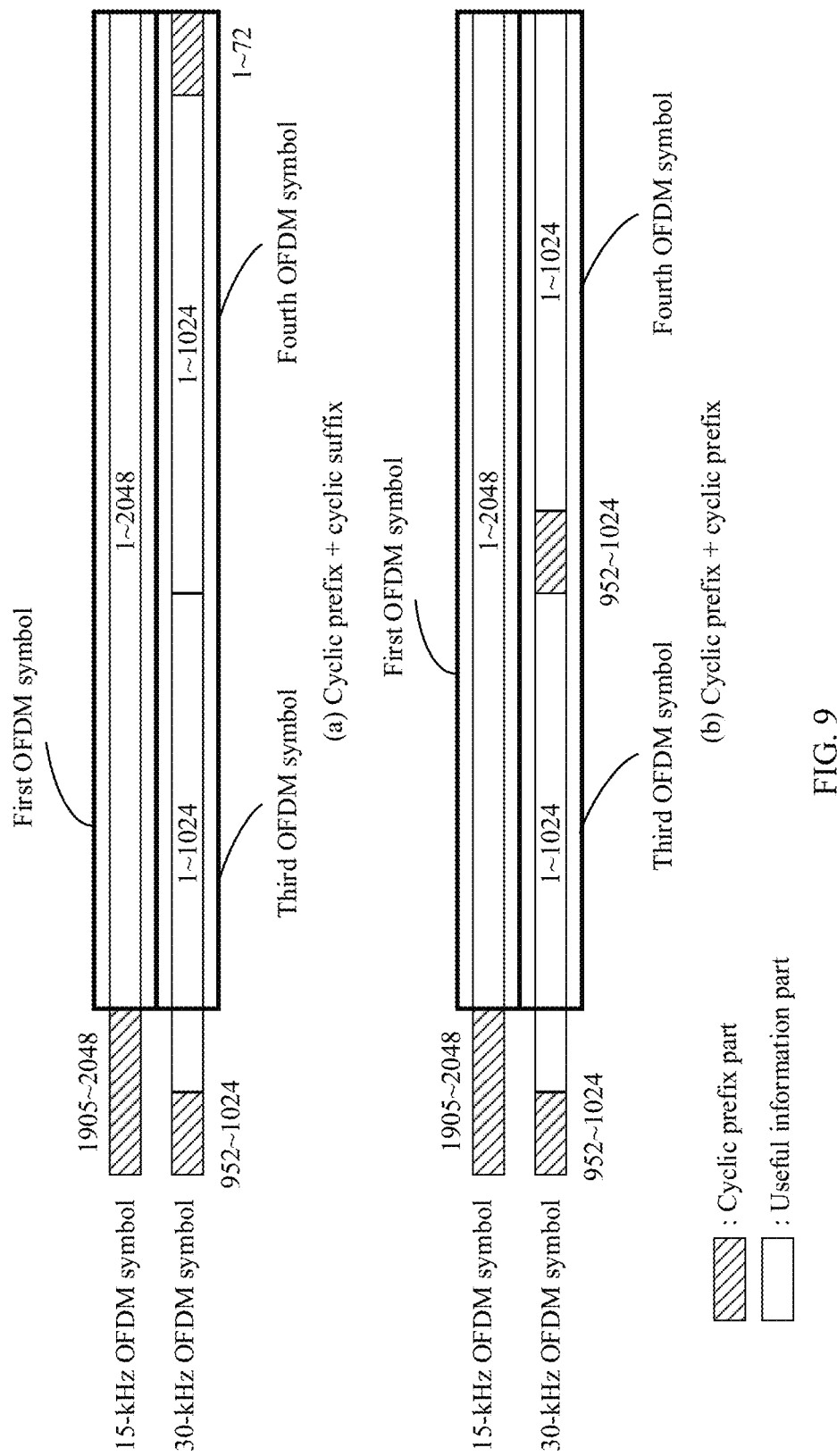
FIG. 9 is a schematic diagram of different OFDM symbols according to an embodiment of this application.

As shown in FIG. 9(a), the first OFDM symbol includes a cyclic prefix part and a useful information part. The cyclic prefix part includes sampling points numbered from 1905 to 2048, and the useful information part includes sampling points numbered from 1 to 2048. The third OFDM symbol includes a cyclic prefix part and a useful information part. The cyclic prefix part includes sampling points numbered from 952 to 1024, and the useful information part includes sampling points numbered from 1 to 1024. The fourth OFDM symbol includes a useful information part and a cyclic suffix part. The useful information part includes sampling points numbered from 1 to 1024, and the cyclic suffix part includes sampling points numbered from 1 to 72. It can be learned from FIG. 9(a) that, after the cyclic prefix is removed from the first OFDM symbol, the corresponding third OFDM symbol and the corresponding fourth OFDM symbol are repeated in time domain. Compared with that shown in FIG. 9(b), both the third OFDM symbol and the fourth OFDM symbol use a cyclic prefix. In this case, after a cyclic prefix is removed from the first OFDM symbol, the corresponding third OFDM symbol and the corresponding fourth OFDM symbol are not repeated in time domain. Consequently, the second reference signal carried on the third OFDM symbol and the fourth OFDM symbol is severely interfered.

EXAMPLE 2

A frequency domain signal of the third time element is multiplied by a phase rotation factor. In some embodiments, the phase rotation factor may be $e^{-2\pi i T_{CP} k/N}$. Alternatively, a frequency domain signal of the fourth time element is multiplied by a phase rotation factor. In some embodiments, the phase rotation factor may be $e^{2\pi i T_{CP} k/N}$.

N is a quantity of FFT points in the third time element or the fourth time element, k is a number of a subcarrier that corresponds to frequency domain on a shared spectrum and that is of the second reference signal carried on the third time element or the fourth time element, and $T_{CP}$ is a CP length used by an OFDM symbol of the second subcarrier spacing.

A frequency domain signal of the third time element is multiplied by a phase rotation factor. In some embodiments, the phase rotation factor may be $e^{-2\pi i T_{CP} k F_2}$. Alternatively, a frequency domain signal of the fourth time element is multiplied by a phase rotation factor. In some embodiments, the phase rotation factor may be $e^{2\pi i T_{CP} k F_2}$, and $T_{CP}$ is a CP length used by an OFDM symbol of the second subcarrier spacing.

$F_2$ is a size of the second subcarrier spacing, and k is a number of a subcarrier that corresponds to frequency domain on a shared spectrum and that is of the second reference signal carried on the third time element or the fourth time element. Due to characteristics of Fourier transformation, phase rotation of a signal in frequency domain is equivalent to a frequency shift of the signal. If the frequency domain signal of the third time element or the fourth time element is multiplied by a phase rotation factor, actually generated signals of 1024 sampling points are 1+Tcp, . . . , 1024+Tcp, that is, time domain signals are sampling points numbered from 73 to 1024. If a cyclic prefix is still used for sampling points numbered from 1 to 1024, a same effect as that shown in FIG. 9(a) in the foregoing example 1 may be achieved in time domain.

In some embodiments, when an OFDM signal is generated, an analog signal generation formula is used for description. The analog signal generation formula may be described as follows:

$$s_l^{(p,\mu)}(t) = \sum_{k=0}^{N_{grid}^{size,\mu} N_{sc}^{RB}-1} a_{k,l}^{(p,\mu)} \cdot e^{j2\pi(k+k_0^\mu - N_{grid,x}^{size,\mu} N_{sc}^{RB}/2)\Delta f(t - N_{CP,l}^\mu T_c - t_{start,l}^\mu)}$$

$$k_0^\mu = (N_{grid,x}^{start,\mu} + N_{grid,x}^{size,\mu}/2)N_{sc}^{RB} - (N_{grid,x}^{start,\mu_0} + N_{grid,x}^{size,\mu_0}/2)N_{sc}^{RB} 2^{\mu_0-\mu}$$

If the foregoing phase factor is described by using an analog signal, the phase factor may be described as $e^{j2\pi(k_0^\mu - N_{grid,x}^{size,\mu} N_{sc}^{RB}/2)\Delta f N_{CP,l}^\mu T_c}$.

Correspondingly, for a receive end, to quickly recover an original frequency domain signal, after removing a cyclic prefix and performing fast Fourier transformation, the frequency domain signal of the third time element or the fourth time element may be multiplied by a negative phase rotation factor $e^{-2\pi i T_{CP} k/N}$. In this way, the original frequency domain signal is recovered.

In some embodiments, RE-level rate matching resources in different subcarrier spacings may be configured, when the receive end demodulates a signal on the third OFDM symbol or the fourth OFDM symbol on a receive side, the signal is to be multiplied by a negative phase rotation factor $e^{-2\pi j T_{CP} k/N}$. Similarly, a phase factor of an analog domain is $e^{-j2\pi(k_0^\mu - N_{grid,x}^{size,\mu} N_{sc}^{RB}/2)\Delta f N_{CP,l}^\mu T_c}$. $N_{SC}^{RB}$ indicates that a quantity of subcarriers included in one resource block is 12, $N_{CP,1}^\mu$ is a CP length of a symbol 1 in a subcarrier spacing $\mu$, $T_c$ is $1/(480*10^3*4096)$, and $\Delta f$ is a subcarrier spacing length=$2^\mu *15$ kHz.

It can be learned from the foregoing description that, in the embodiments of this application, when the first time element and the second time element overlap in time domain, a frequency domain resource occupied by the first resource element may overlap a frequency domain resource occupied by the second resource element. In this way, frequency domain resource utilization is improved. Further, in the embodiments of this application, the second resource element may overlap only a frequency domain resource of a first resource element whose subcarrier index is an odd number. In a manner of repeatedly sending the second reference signal in the second time element (time domain repetition, which is equivalent to frequency domain zero padding), there may be no interference between the first reference signal sent in the first resource element whose subcarrier index is an odd number and the second reference signal sent in the second resource element. It can be learned that, the method in this application is used, so that interference between the first reference signal and the second reference signal can be reduced while resource utilization is improved.

In the embodiments of this application, an example is used for description, where the first reference signal is a CRS, the CRS is transmitted on an LTE carrier, the first subcarrier spacing is 15 kHz, the second reference signal is a DRMS, the DRMS is transmitted on an NR carrier, and the second subcarrier spacing is 30 kHz. It may be understood that because the DRMS is transmitted on the PDSCH, in the embodiments of this application, the DRMS and the PDSCH may be used equivalently.

When the NR carrier and the LTE carrier are overlapped on a segment of frequency domain resources, to enable the NR carrier to fully utilize an unused RE resource of the LTE carrier and avoid interference to a CRS signal continuously transmitted on the LTE carrier, it is stipulated in a related protocol that rate matching is performed, for an NR PDSCH, on an RE resource corresponding to an LTE CRS, that is, information bits of the NR PDSCH are not mapped to the RE resource corresponding to the LTE CRS. Therefore, interference to the LTE CRS signal is avoided when the NR PDSCH is transmitted.

Figure 10:
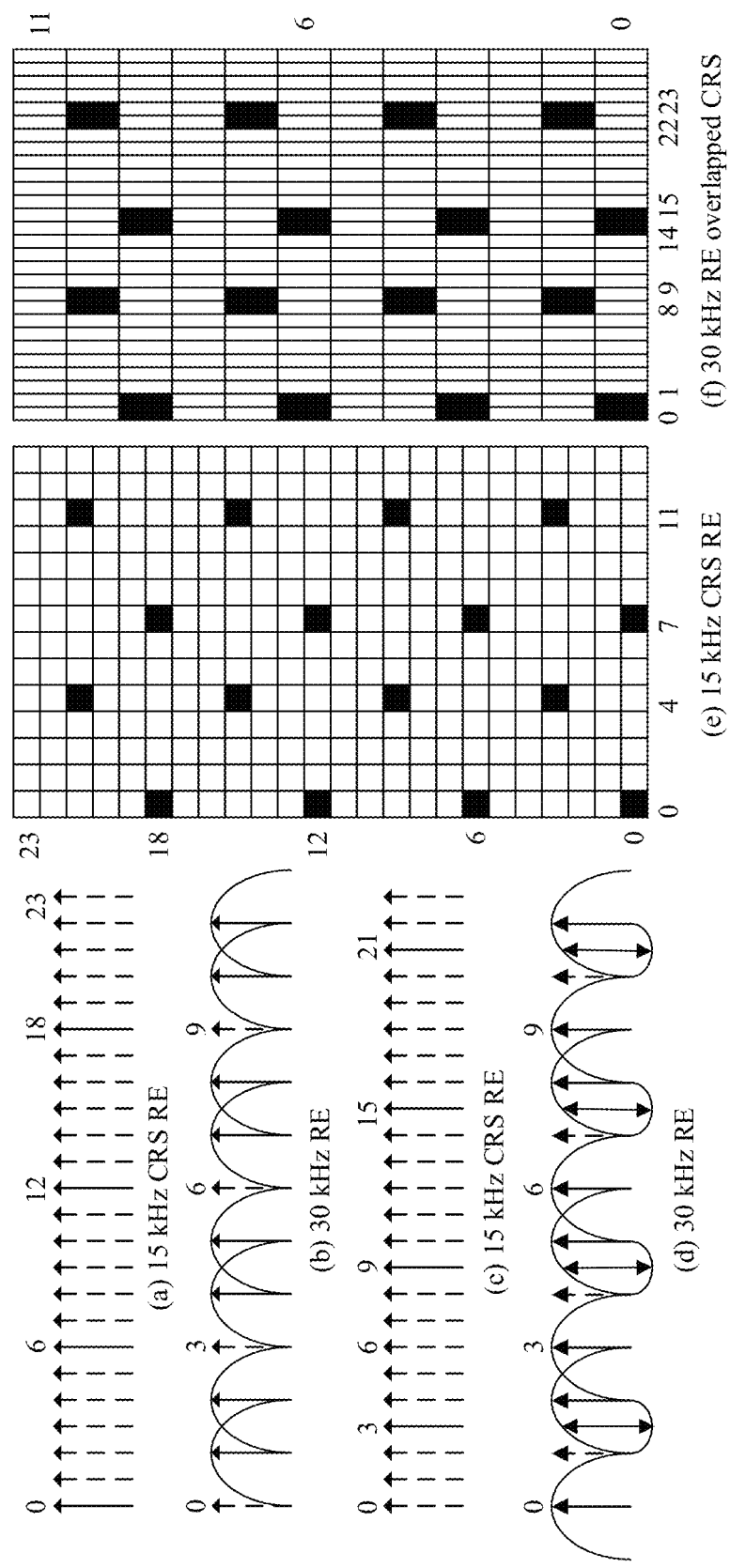
FIG. 10 is a schematic diagram of spectrums of a CRS and a DMRS in different RE mappings according to an embodiment of this application.

For example, as shown in FIG. 10(*e*), a 15-kHz subcarrier spacing is used to transmit a CRS. In time domain, the CRS occupies a symbol 0, a symbol 4, a symbol 7, and a symbol 11. In frequency domain, subcarriers occupied by the CRS occupy RE0, RE3, RE6, RE9, RE12, RE15, RE18, RE21, and the like. For details, refer to a black filled part in FIG. 10(*e*). As shown in FIG. 10(*f*), a 30-kHz subcarrier spacing is used to transmit a DMRS. For example, a CRS of 15 kHz is simply mapped on a 30-kHz subcarrier. For an RE corresponding to the CRS of 15 kHz in the case of 30-kHz subcarrier spacing, refer to a black filled part in FIG. 10(*f*). For example, a rule of the rate matching may be as follows: In the 30-kHz subcarrier spacing, the black filled part in FIG. 10(*f*) is not used to transmit the DMRS. That is, an unfilled RE in FIG. 10(*f*) is used to transmit the DMRS.

For example, FIG. 10(*a*) is a schematic diagram of a spectrum of a CRS transmitted on a symbol 0 when a subcarrier spacing is 15 kHz. For example, in FIG. 10(*a*), a solid arrow indicates that a corresponding RE is used to transmit the CRS.

A dashed arrow indicates that a corresponding RE is not used to transmit the CRS. FIG. 10(*b*) is a schematic diagram of a spectrum of a DMRS transmitted on a symbol 0 or a symbol 1 when a subcarrier spacing is 30 kHz. For example, in FIG. 10(*b*), a dashed arrow indicates that a corresponding RE is not used to transmit a DMRS, and a solid arrow indicates that a corresponding RE is used to transmit a DMRS.

Similarly, FIG. 10(*c*) is a schematic diagram of a spectrum of a CRS transmitted on a symbol 4 when a subcarrier spacing is 15 kHz. FIG. 10(*d*) is a schematic diagram of a spectrum of a DMRS transmitted on a symbol 8 or a symbol 9 when a subcarrier spacing is 30 kHz.

For rate matching shown in FIG. 10(*d*), a main lobe of a 30 kHz RE2 is non-zero at a 15 kHz CRS RE3, and a side lobe of a 30 kHz RE3 is non-zero at the 15 kHz CRS RE3. This causes severe interference to an LTE CRS. For CRSs with 1/2/4 antenna ports, CRS REs are distributed on an RE of a subcarrier with an odd number index and an RE of a subcarrier with an even number index. The RE of the subcarrier with the odd number index is severely interfered with a 30-kHz DMRS. A subcarrier index represents an identifier of a subcarrier in a resource grid, and the subcarrier index may increase sequentially from 0 along a frequency increasing direction.

Figure 11:
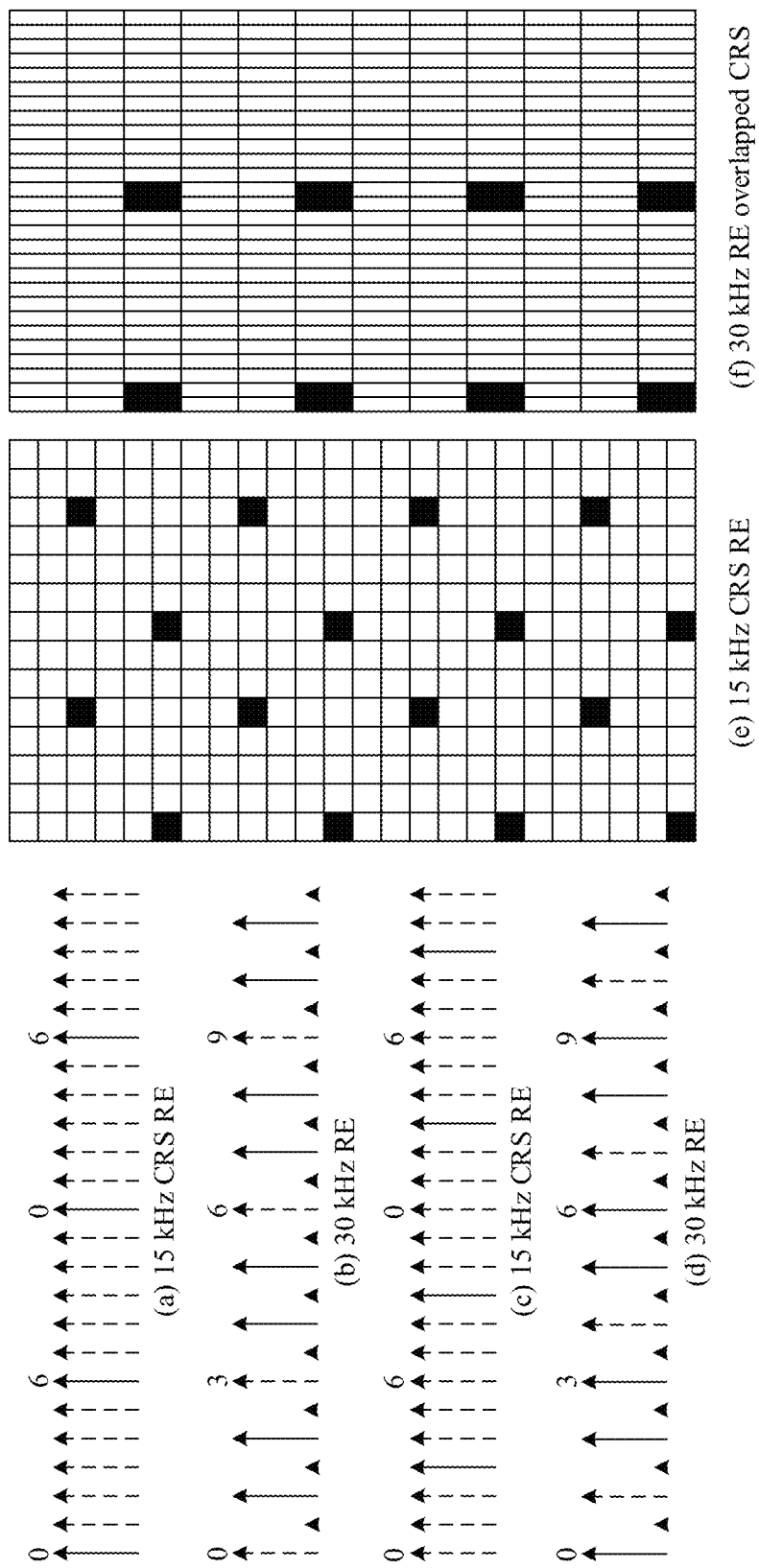
FIG. 11 is a schematic diagram of spectrums of a CRS and a DMRS in different RE mappings according to an embodiment of this application.

For a signal, repeating the signal in time domain is equivalent to performing frequency zero padding on the signal. Sampling points of 30-kHz OFDM symbols are repeated in time domain after falling into 15 kHz. It can be learned from FIG. 11(*b*) and FIG. 11(*d*) that, in frequency domain, zero padding is performed on a subcarrier spacing of 30 kHz at 15 kHz. It can be learned that, in a time domain repetition manner, when a subcarrier spacing is 15 kHz, an RE on a subcarrier with an odd number index is not interfered with a 30-kHz DMRS. For how to perform time domain repetition, refer to the solution described in Embodiment 3. Details are not described herein again.

An application scenario is provided for an embodiment of this application. It may be understood that the application scenario is not intended to limit the embodiments of this application. In the application scenario, an example is used for description, where the first reference signal is a CRS and is corresponding to a subcarrier spacing of 15 kHz, and the second reference signal is a DMRS and is corresponding to a subcarrier spacing of 30 kHz.

Figure 12:
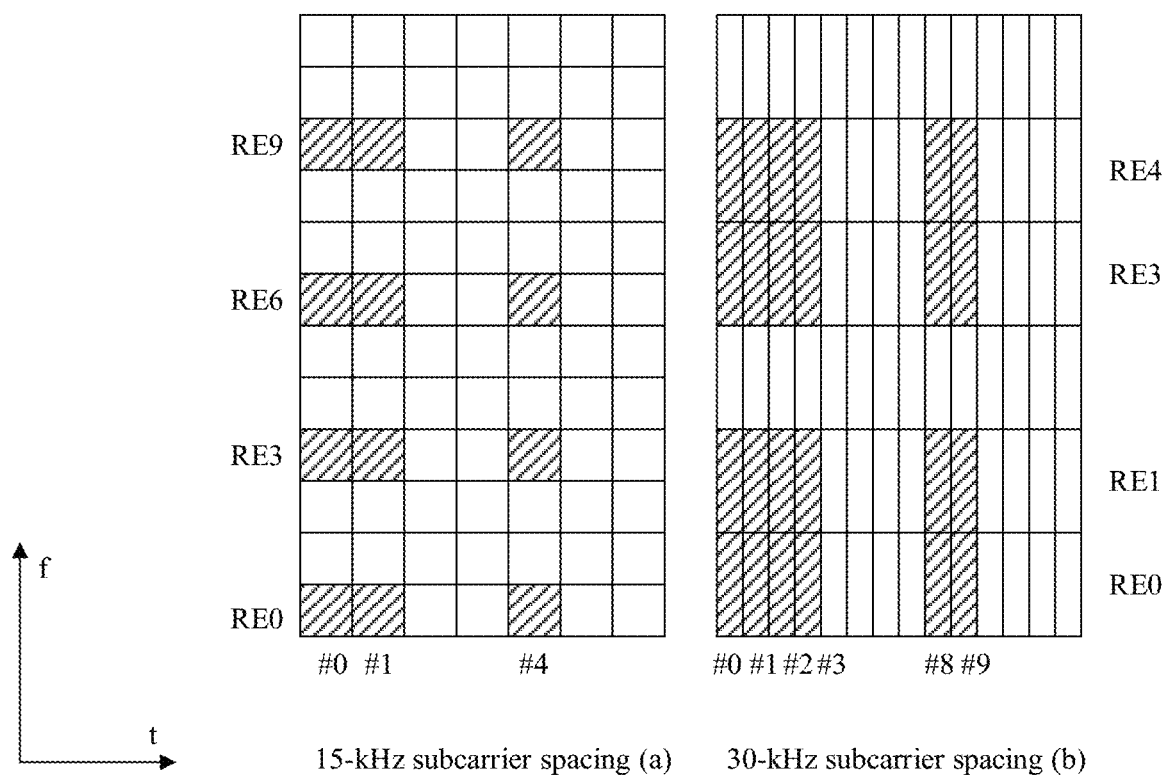
FIG. 12 is a schematic diagram of REs to which a CRS and a DMRS are mapped in different subcarrier spacings according to an embodiment of this application.

When the subcarrier spacing is 15 kHz, and four ports are configured for the CRS, ODFM symbols occupied by the CRS are symbol #0, symbol #1, symbol #4, symbol #7, symbol #8, and symbol #11. (In FIG. 10, only the symbol #0, the symbol #1, and the symbol #4 are shown as examples for description.) For details, refer to a slash filled part in FIG. 12(a). When the subcarrier spacing is 30 kHz, for the 30 kHz RE that overlaps the CRS RE, refer to a slash filled part in FIG. 12(b).

For type-A PDSCH mapping, in the 30-kHz subcarrier spacing, a first-type DMRS or a second-type DMRS cannot be carried on the symbol 2 or the symbol 3, that is, the DMRS cannot be correctly demodulated. For descriptions of the first-type DMRS or the second-type DMRS, and the type-A PDSCH mapping, refer to the descriptions of the DMRS part in the communication term explanation ☐. Details are not Described Herein Again.

In the embodiments of this application, the network device may send CRS configuration information of at least one LTE carrier on a 30-kHz BWP. Correspondingly, the terminal device receives the CRS configuration information of the at least one LTE carrier.

For example, CRS configuration information of one LTE carrier may include: an LTE carrier bandwidth (such as 1.4M, 3M, 5M, 10M, 15M, and 20M), a quantity of CRS antenna ports (1/2/4 or the like), a shift value of a CRS mapping RE (0/1/2/3/4/5 or the like), and a position of a center of the LTE carrier. An RE resource position to which the CRS is actually mapped may be obtained based on the shift value (shift) of the CRS mapping RE and the pattern shown in FIG. 3 whose shift value is 0.

The network device sends DMRS configuration information on the 30-kHz BWP. Correspondingly, the terminal device receives the DMRS configuration information. For example, the DMRS configuration information includes at least a DMRS type, a DMRS symbol length, an additional DMRS symbol position, and the like.

The network device sends scheduling information. Correspondingly, the terminal device receives the scheduling information. The scheduling information may indicate that a type of PDSCH scheduling is slot scheduling, and the slot scheduling is the type-A PDSCH mapping.

In a solution, in the embodiments of this application, when four ports are configured for the LTE CRS, the terminal device may not expect that an RE resource occupied by a received DMRS overlaps an even-numbered RE resource occupied by the CRS RE. Alternatively, it may be referred to as that the terminal device expects that the RE resource occupied by the received DMRS overlaps an odd-numbered RE resource occupied by the CRS RE.

In the embodiments of this application, a solution in which the terminal device does not expect that an RE resource occupied by a received DMRS overlaps an even-numbered RE resource occupied by the CRS RE may include the following solution:

The terminal device does not expect to receive a first-type DMRS configuration.

Figure 13:
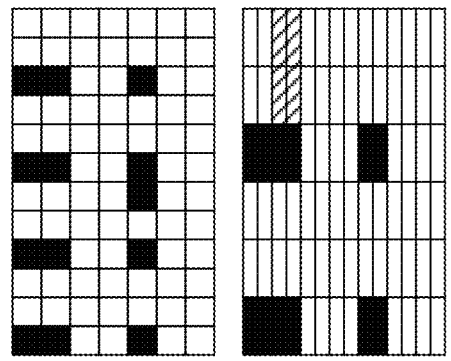
FIG. 13 is a schematic diagram of CDM groups occupied by DMRSs with different shift values according to an embodiment of this application.
Figure 13:
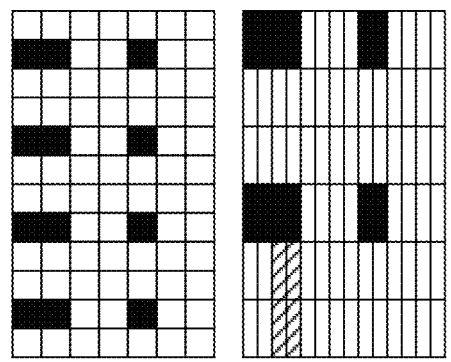
Figure 13:
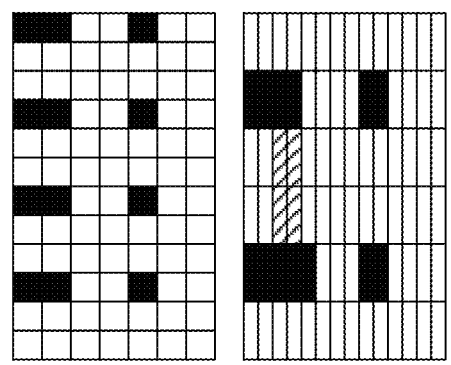

When the DMRS configuration received by the terminal device is a second type, a UE expects that a received CDM group index is related to a shift value of the LTE CRS. Specifically, as shown in FIG. 13, that is, when the LTE CRS shift value is 0/3, the CDM group index expected to be received by the UE is 2. When the CRS shift value is 1/4, the CDM group index expected to be received by the UE is 0. When the CRS shift value is 2/5, the CDM group index expected to be received by the UE is 1. It should be noted that, in examples shown in FIG. 13, the shift values 0, 1, and 2 are used as an example for description. Other examples are similar to the foregoing case, and are not further described. It should be noted that, in FIG. 13, a black filled part may be used to represent an RE used to transmit a CRS, and a slash filled part may be used to represent an RE used to transmit a DMRS.

In the embodiments of this application, rate matching may be performed on the 30-kHz DMRS according to the 15-kHz LTE CRS RE. When the 4-port CRS configuration is enabled, the DMRS of the PDSCH based on slot scheduling can be normally transmitted. The LTE CRS is not affected.

Figure 14:
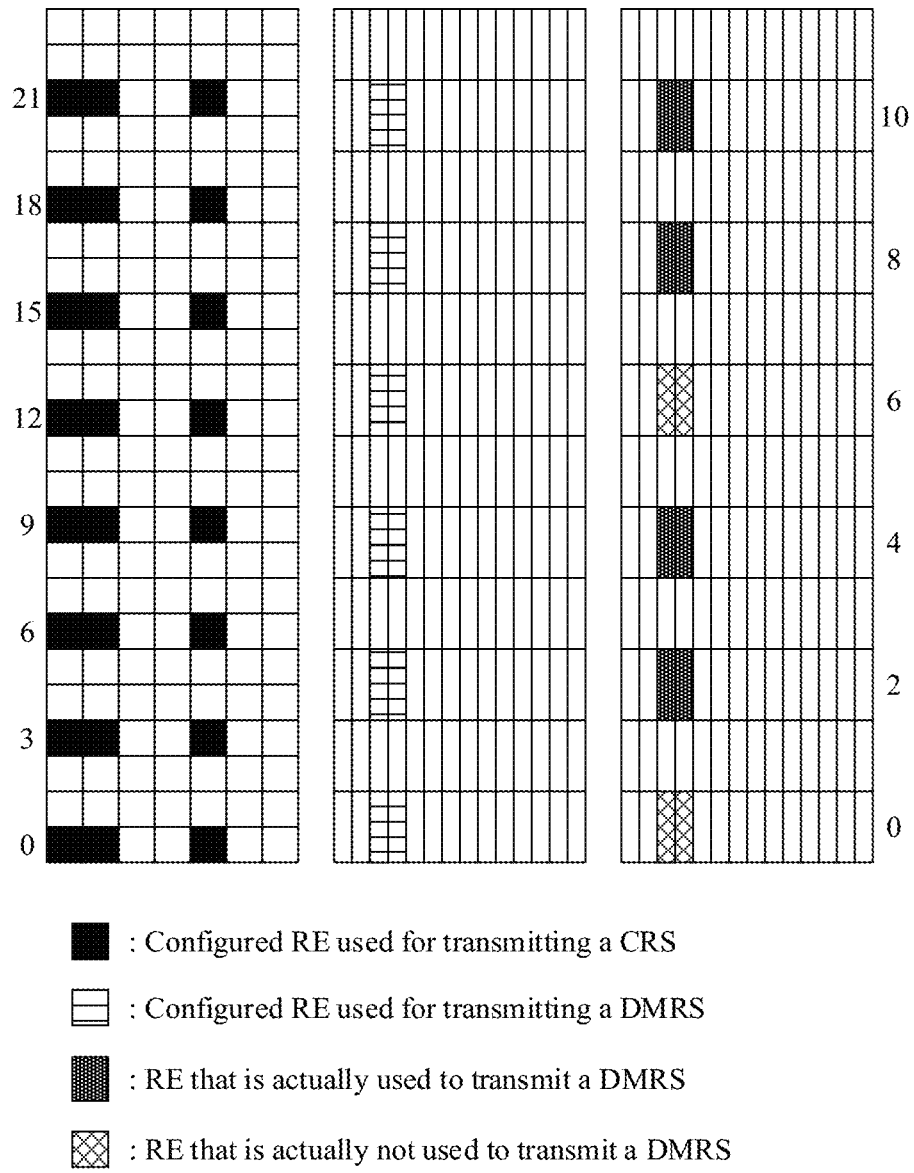
FIG. 14 is a schematic diagram of an RE for transmitting a CRS and an RE for transmitting a DMRS according to an embodiment of this application.

In another solution, the terminal device receives a DMRS CDM group, and determines an RE resource occupied by the DMRS based on the DMRS CDM group. When the RE resource occupied by the DMRS overlaps the RE resource occupied by the CRS, if a subcarrier index of the RE resource occupied by the CRS is an even number, and if a DMRS is mapped to a corresponding 30 kHz RE after the index is divided by 2, the DMRS is not transmitted on the corresponding 30 kHz RE. Correspondingly, the terminal device does not perform channel estimation by using a signal on the RE. As shown in FIG. 14, a number of RE/subcarrier occupied by a CRS is #0/3/6/9/12/15/18/21. After an indicated DMRS RE overlaps an RE obtained after #0 and #12 are divided by 2, a DMRS is not transmitted on a corresponding DMRS RE, to avoid interference to an LTE CRS. To be specific, REs/subcarrier numbers #0 and #6 that are on the rightmost side of the figure and that are compared with the middle DMRS are not used to transmit a DMRS signal.

In the embodiments provided in this application, the method provided in the embodiments of this application is described from perspectives of the network device, the terminal, and interaction between the network device and the terminal. To implement functions in the foregoing methods provided in the embodiments of this application, the network device and the terminal device may include a hardware structure and/or a software module, and implement the foregoing functions in a form of the hardware structure, the software module, or a combination of the hardware structure and the software module. Whether a specific function in the foregoing functions is performed by the hardware structure, the software module, or the combination of the hardware structure and the software module depends on a specific application and a design constraint condition of the technical solutions.

Figure 15:
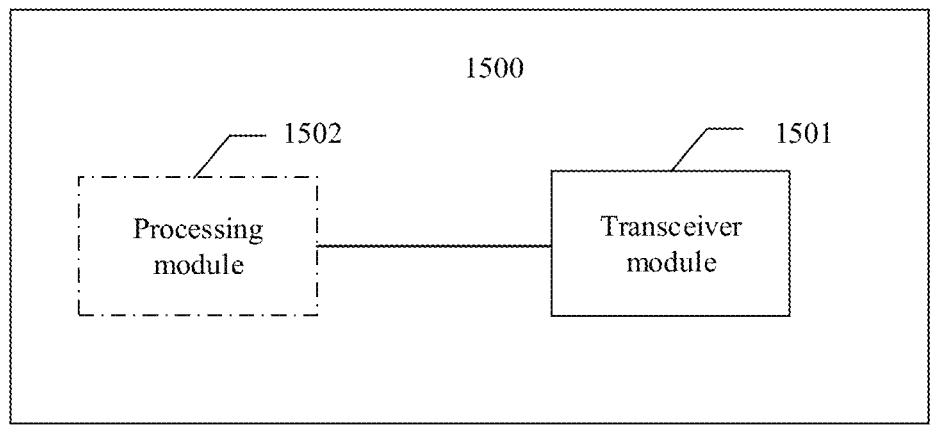
FIG. 15 is a schematic diagram of a communication apparatus according to an embodiment of this application.

Same as the foregoing concept, as shown in FIG. 15, an embodiment of this application further provides an apparatus 1500, including a transceiver module 1501. In some embodiments, the apparatus 1500 may further include a processing module 1502.

In an example, the apparatus 1500 is configured to implement a function of the network device in the foregoing methods. The apparatus may be a network device, or may be an apparatus in the network device. The apparatus may be a chip system, and the chip system may include a chip, or may include a chip and another discrete component.

The transceiver module 1501 is configured to send first configuration information and second configuration information. The processing module 1502 is configured to determine the first configuration information, the second configuration information, and the like.

The first configuration information is used to map a first reference signal to a first resource element set in a first time element, where the first resource element set includes at least a first resource element. The second configuration information is used to map a second reference signal to a second resource element set in a second time element, where the second resource element set includes at least a second resource element. When the first time element and the second time element overlap in time domain, a frequency domain resource occupied by the first resource element overlaps a frequency domain resource occupied by the second resource element.

In another example, the apparatus 1500 is configured to implement a function of the terminal device in the foregoing methods. The apparatus may be a terminal device, or may be an apparatus in the terminal device. The apparatus may be a chip system, and the chip system may include a chip, or may include a chip and another discrete component.

The transceiver module 1501 is configured to receive first configuration information and second configuration information. The processing module 1502 is configured to process the first configuration information, the second configuration information, and the like.

For a specific implementation of the transceiver module 1501 and the processing module 1502, refer to the descriptions in the foregoing method embodiments. Division into the modules in the embodiments of this application is an example, is merely division into logical functions, and may be other division during actual implementation. In addition, functional modules in the embodiments of this application may be integrated into one processor, or each of the modules may exist alone physically, or two or more modules may be integrated into one module. The integrated module may be implemented in a form of hardware, or may be implemented in a form of a software function module.

Figure 16:
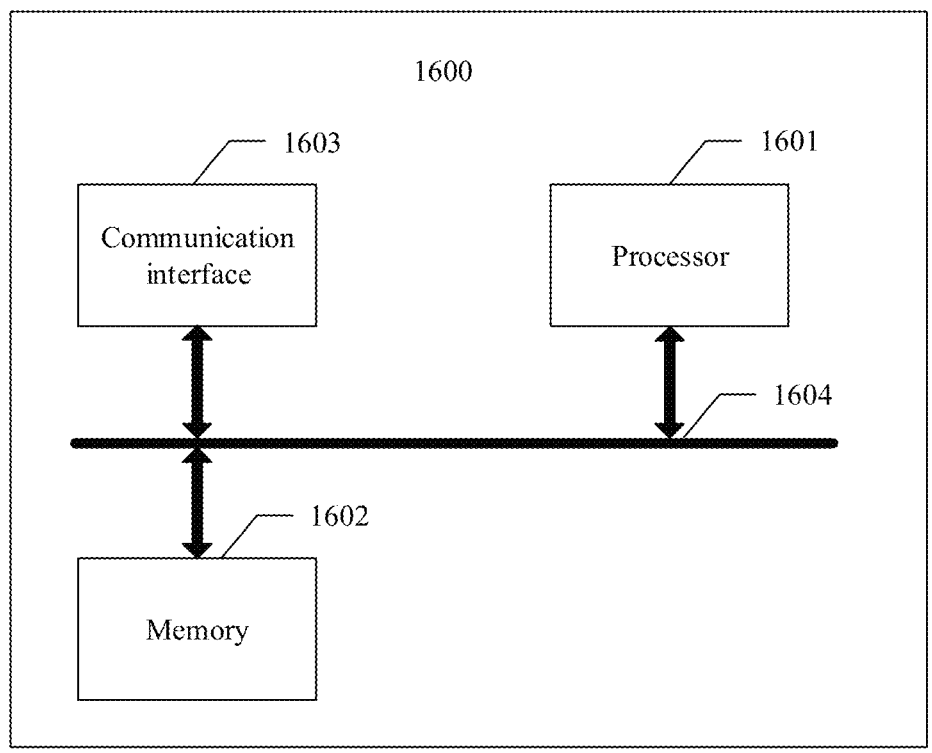
FIG. 16 is a schematic diagram of a communication apparatus according to an embodiment of this application.

Same as the foregoing concept, as shown in FIG. 16, an embodiment of this application further provides an apparatus 1600.

In an example, the apparatus 1600 is configured to implement a function of the network device in the foregoing methods. The apparatus may be a network device, or may be an apparatus in the network device. The apparatus 1600 includes at least one processor 1601, configured to implement a function of the network device in the foregoing methods. For example, the processor 1601 may determine first configuration information and second configuration information. For details about the first configuration information and the second configuration information, refer to descriptions in the method embodiments. Details are not described herein again. The apparatus 1600 may further include at least one memory 1602, configured to store program instructions and/or data. The memory 1602 is coupled to the processor 1601. Coupling in the embodiments of this application may be indirect coupling or a communication connection between apparatuses, units, or modules in an electrical form, a mechanical form, or another form, and is used for information exchange between the apparatuses, the units, or the modules. The processor 1601 and the memory 1602 operate in cooperation with each other. The processor 1601 may execute the program instructions stored in the memory 1602. At least one of the at least one memory may be included in the processor. The apparatus 1600 may further include a communication interface 1603, configured to communicate with another device through a communication transmission medium, so that the apparatus in the apparatus 1600 may communicate with the another device. For example, the communication interface 1603 may be a transceiver, a circuit, a bus, a module, or another type of communication interface, and the another device may be a terminal device. The processor 1601 receives and sends data through the communication interface 1603, and is configured to implement the methods in the foregoing embodiments. For example, the communication interface 1603 may send the first configuration information, the second configuration information, and the like.

In an example, the apparatus 1600 is configured to implement a function of the terminal device in the foregoing methods. The apparatus may be a terminal device, or may be an apparatus in the terminal device. The apparatus 1600 includes at least one processor 1601, configured to implement the function of the terminal device in the foregoing methods. For example, the processor 1601 may process first configuration information and second configuration information.

For details about the first configuration information and the second configuration information, refer to descriptions in the method embodiments. Details are not described herein again. The apparatus 1600 may further include at least one memory 1602, configured to store program instructions and/or data. The memory 1602 is coupled to the processor 1601. Coupling in the embodiments of this application may be indirect coupling or a communication connection between apparatuses, units, or modules in an electrical form, a mechanical form, or another form, and is used for information exchange between the apparatuses, the units, or the modules. The processor 1601 and the memory 1602 cooperate. The processor 1601 may execute the program instructions stored in the memory 1602. At least one of the at least one memory may be included in the processor. The apparatus 1600 may further include a communication interface 1603, configured to communicate with another device through a communication transmission medium, so that the apparatus in the apparatus 1600 may communicate with the another device. For example, the communication interface 1603 may be a transceiver, a circuit, a bus, a module, or another type of communication interface, and the another device may be a network device. The processor 1601 receives and sends data through the communication interface 1603, and is configured to implement the methods in the foregoing embodiments. For example, the communication interface 1603 may receive the first configuration information, the second configuration information, and the like.

A connection medium between the communication interface 1603, the processor 1601, and the memory 1602 is not limited in the embodiments of this application. In the embodiments of this application, in FIG. 16, the memory 1602, the processor 1601, and the communication interface 1603 are connected by using a bus 1604. The bus is represented by a thick line in FIG. 16. A manner of connecting other components is merely an example for description, and is not limited thereto. The bus may be classified into an address bus, a data bus, a control bus, and the like. For ease of representation, only one thick line is used to represent the bus in FIG. 16, but this does not mean that there is only one bus or only one type of bus.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor, any processor, or the like. The steps of the methods disclosed with reference to the embodiments of this application may be directly performed by a hardware processor, or may be performed by using a combination of hardware in the processor and a software module.

In the embodiments of this application, the memory may be a non-volatile memory, for example, a hard disk drive (HDD) or a solid-state drive (SSD); or may be a volatile memory (volatile memory), for example, a random access memory (RAM). The memory is any other medium that can be configured to carry or store expected program code in a form of instructions or a data structure and that can be accessed by a computer, but is not limited thereto. The memory in the embodiments of this application may alternatively be a circuit or any other apparatus that can implement a storage function, and is configured to store program instructions and/or data.

All or a part of the methods in the embodiments of this application may be implemented by using software, hardware, firmware, or any combination thereof. When software is used to implement the embodiments, the embodiments may be implemented all or partially in a form of a computer program product. The computer program product includes one or more computer instructions. When the computer program instructions are loaded and executed on a computer, all or some of the procedures or the functions according to the embodiments of the present disclosure are generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital video disc (DVD for short)), a semiconductor medium (for example, an SSD), or the like.

Obviously, a person skilled in the art can make various modifications and variations to this application without departing from the scope of this application. This application is intended to cover these modifications and variations of this application provided that they fall within the scope of protection defined by the following claims and their equivalent technologies.

In embodiments of this application, "at least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be singular or plural. The character "/" generally indicates an "or" relationship between the associated objects.

It should be noted that, in the embodiments of this application, different embodiments may be used independently or in combination with each other. This is not limited in the embodiments of this application. In addition, on a premise that there is no logical contradiction, the embodiments may be mutually referenced. For example, methods and/or terms in the method embodiments may be mutually referenced, functions and/or terms in the apparatus embodiments may be mutually referenced, and functions and/or terms in the apparatus embodiments and the method embodiments may be mutually referenced.

What is claimed is:

1. A communication method, comprising:
   sending, by a network device, first configuration information, wherein the first configuration information is useable to map a first reference signal to a first resource element set in a first time element, and the first resource element set comprises at least a first resource element; and
   sending, by the network device, second configuration information, wherein the second configuration information is useable to map a second reference signal to a second resource element set in a second time element, and the second resource element set comprises at least a second resource element, wherein
   a frequency domain resource occupied by the first resource element overlaps a frequency domain resource occupied by the second resource element in response to the first time element and the second time element overlapping each other in a time domain;
   wherein a subcarrier spacing of the first reference signal is a first subcarrier spacing, and a subcarrier index of the first resource element is a first value, and is in the first subcarrier spacing; and
   the second resource element fails to be useable to transmit the second reference signal in response to a value of the first value being an integer multiple of $2^n$; or
   the second resource element is useable to transmit the second reference signal in response to a value of the first value failing to be an integer multiple of $2^n$, and n is a positive integer greater than or equal to 1.

2. The method according to claim 1, wherein a first subcarrier spike is aligned with a second subcarrier spike; and
   the first subcarrier spike is a subcarrier spike corresponding to a resource element whose subcarrier index is an integer multiple of $2^n$ in a first subcarrier spacing, the second subcarrier spike is a subcarrier spike corresponding to one resource element in a second subcarrier spacing, the first subcarrier spacing is a subcarrier spacing of the first reference signal, the second subcarrier spacing is a subcarrier spacing of the second reference signal, and the second subcarrier spacing is $2^n$ times the first subcarrier spacing.

3. The method according to claim 1, wherein a subcarrier spacing of the first reference signal is a first subcarrier spacing, a subcarrier spacing of the second reference signal is a second subcarrier spacing, the second subcarrier spacing is $2^n$ times the first subcarrier spacing, where n is a positive integer greater than or equal to 1, and the first time element in the first subcarrier spacing corresponds to $2^n$ second time elements in the second subcarrier spacing; and the method further comprises:
   repeatedly sending, by the network device, the second reference signal in the $2^n$ second time elements that correspond to the first time element.

4. The method according to claim 3, wherein the $2^n$ second time elements comprise at least a third time element and a fourth time element, and at least one of the following configurations:
   the fourth time element includes a cyclic suffix,
   a frequency domain signal of the third time element is multiplied by a phase rotation factor, or a frequency domain signal of the fourth time element is multiplied by the phase rotation factor.

5. A communication method, comprising:

receiving, by a terminal device, first configuration information from a network device, wherein the first configuration information is useable to map a first reference signal to a first resource element set in a first time element, and the first resource element set comprises at least a first resource element; and receiving, by the terminal device, second configuration information from the network device, wherein the second configuration information is useable to map a second reference signal to a second resource element set in a second time element, and the second resource element set comprises at least a second resource element, wherein a frequency domain resource occupied by the first resource element overlaps a frequency domain resource occupied by the second resource element in response to the first time element and the second time element overlapping each other in a time domain;

wherein a subcarrier spacing of the first reference signal is a first subcarrier spacing, and a subcarrier index of the first resource element is a first value, and is in the first subcarrier spacing; and the second resource element fails to be useable to transmit the second reference signal in response to a value of the first value being an integer multiple of $2^n$; or the second resource element is useable to transmit the second reference signal in response to a value of the first value failing to be an integer multiple of $2^n$, and n is a positive integer greater than or equal to 1.

6. The method according to claim 5, wherein a first subcarrier spike is aligned with a second subcarrier spike; and the first subcarrier spike is a subcarrier spike corresponding to a resource element whose subcarrier index is an integer multiple of $2^n$ in a first subcarrier spacing, the second subcarrier spike is a subcarrier spike corresponding to one resource element in a second subcarrier spacing, the first subcarrier spacing is a subcarrier spacing of the first reference signal, the second subcarrier spacing is a subcarrier spacing of the second reference signal, and the second subcarrier spacing is $2^n$ times the first subcarrier spacing.

7. The method according to claim 5, wherein a subcarrier spacing of the first reference signal is a first subcarrier spacing, a subcarrier spacing of the second reference signal is a second subcarrier spacing, the second subcarrier spacing is $2^n$ times the first subcarrier spacing, where n is a positive integer greater than or equal to 1, and the first time element in the first subcarrier spacing corresponds to $2^n$ second time elements in the second subcarrier spacing; and the method further comprises:

repeatedly receiving, by the terminal device, the second reference signal in the $2^n$ second time elements that correspond to the first time element.

8. The method according to claim 7, wherein the $2^n$ second time elements comprise at least a third time element and a fourth time element, and at least one of the following configurations:

the fourth time element includes a cyclic suffix,
a frequency domain signal of the third time element is multiplied by a phase rotation factor, or
a frequency domain signal of the fourth time element is multiplied by the phase rotation factor.

9. An apparatus, comprising:

a communication interface, configured to send first configuration information, wherein the first configuration information is useable to determine a first resource element set useable to map a first reference signal to a first time element, and the first resource element set comprises at least a first resource element; and the communication interface is further configured to send second configuration information, wherein the second configuration information is useable to determine a second resource element set useable to map a second reference signal to a second time element, and the second resource element set comprises at least a second resource element; and a frequency domain resource occupied by the first resource element overlaps a frequency domain resource occupied by the second resource element in response to the first time element and the second time element overlapping each other in a time domain;

wherein a subcarrier spacing of the first reference signal is a first subcarrier spacing, and a subcarrier index of the first resource element is a first value, and is in the first subcarrier spacing; and the second resource element fails to be useable to transmit the second reference signal in response to a value of the first value being an integer multiple of $2^n$; or the second resource element is useable to transmit the second reference signal in response to a value of the first value failing to be an integer multiple of $2^n$, and n is a positive integer greater than or equal to 1.

10. The apparatus according to claim 9, wherein a first subcarrier spike is aligned with a second subcarrier spike; and the first subcarrier spike is a subcarrier spike corresponding to a resource element whose subcarrier index is an integer multiple of $2^n$ in a first subcarrier spacing, the second subcarrier spike is a subcarrier spike corresponding to one resource element in a second subcarrier spacing, the first subcarrier spacing is a subcarrier spacing of the first reference signal, the second subcarrier spacing is a subcarrier spacing of the second reference signal, and the second subcarrier spacing is $2^n$ times the first subcarrier spacing.

11. The apparatus according to claim 9, wherein a subcarrier spacing of the first reference signal is a first subcarrier spacing, a subcarrier spacing of the second reference signal is a second subcarrier spacing, the second subcarrier spacing is $2^n$ times the first subcarrier spacing, where n is a positive integer greater than or equal to 1, and the first time element in the first subcarrier spacing corresponds to $2^n$ second time elements in the second subcarrier spacing; and the communication interface is further configured to:

repeatedly send the second reference signal in the $2^n$ second time elements that correspond to the first time element.

12. The apparatus according to claim 11, wherein the $2^n$ second time elements comprise at least a third time element and a fourth time element, and at least one of the following configurations:

the fourth time element includes a cyclic suffix,
a frequency domain signal of the third time element is multiplied by a phase rotation factor, or
a frequency domain signal of the fourth time element is multiplied by the phase rotation factor.

13. An apparatus, comprising:

a communication interface, configured to send first configuration information, wherein the first configuration information is useable to determine a first resource element set useable to map a first reference signal to a first time element, and the first resource element set comprises at least a first resource element; and the communication interface is further configured to receive second configuration information, wherein the second configuration information is useable to determine a second resource element set useable to map a second reference signal to a second time element, and the second resource element set comprises at least a second resource element, wherein a frequency domain resource occupied by the first resource element overlaps a frequency domain resource occupied by the second resource element in response to the first time element and the second time element overlapping each other in a time domain;

wherein a subcarrier spacing of the first reference signal is a first subcarrier spacing, and a subcarrier index of the first resource element is a first value, and is in the first subcarrier spacing; and the second resource element fails to be useable to transmit the second reference signal in response to a value of the first value being an integer multiple of $2^n$; or the second resource element is useable to transmit the second reference signal in response to a value of the first value failing to be an integer multiple of $2^n$, and n is a positive integer greater than or equal to 1.

14. The apparatus according to claim 13, wherein a first subcarrier spike is aligned with a second subcarrier spike; and the first subcarrier spike is a subcarrier spike corresponding to a resource element whose subcarrier index is an integer multiple of $2^n$ in a first subcarrier spacing, the second subcarrier spike is a subcarrier spike corresponding to one resource element in a second subcarrier spacing, the first subcarrier spacing is a subcarrier spacing of the first reference signal, the second subcarrier spacing is a subcarrier spacing of the second reference signal, and the second subcarrier spacing is $2^n$ times the first subcarrier spacing.

15. The apparatus according to claim 13, wherein a subcarrier spacing of the first reference signal is a first subcarrier spacing, a subcarrier spacing of the second reference signal is a second subcarrier spacing, the second subcarrier spacing is $2^n$ times the first subcarrier spacing, where n is a positive integer greater than or equal to 1, and the first time element in the first subcarrier spacing corresponds to $2^n$ second time elements in the second subcarrier spacing; and the communication interface is further configured to:

repeatedly receive the second reference signal in the $2^n$ second time elements that correspond to the first time element.

16. The apparatus according to claim 15, wherein the $2^n$ second time elements comprise at least a third time element and a fourth time element, and at least one of the following configurations:

the fourth time element includes a cyclic suffix, a frequency domain signal of the third time element is multiplied by a phase rotation factor, or a frequency domain signal of the fourth time element is multiplied by the phase rotation factor.

* * * * *